US010909866B2

(12) United States Patent
Jacobus et al.

(10) Patent No.: US 10,909,866 B2
(45) Date of Patent: Feb. 2, 2021

(54) AUTONOMOUS TRANSPORTATION SYSTEM AND METHODS

(71) Applicant: Cybernet Systems Corp., Ann Arbor, MI (US)

(72) Inventors: Charles J. Jacobus, Brighton, MI (US); Douglas Haanpaa, Ann Arbor, MI (US); Eugene Foulk, Ann Arbor, MI (US); Pritpaul Mahal, Ann Arbor, MI (US); Steve Rowe, Grass Lake, MI (US); Charles J. Cohen, Ann Arbor, MI (US); Glenn J. Beach, Ann Arbor, MI (US)

(73) Assignee: Cybernet Systems Corp., Ann Arbor, MI (US)

( * ) Notice: Subject to any disclaimer, the term of this patent is extended or adjusted under 35 U.S.C. 154(b) by 0 days.

(21) Appl. No.: 16/180,739

(22) Filed: Nov. 5, 2018

(65) Prior Publication Data
US 2019/0088148 A1 Mar. 21, 2019

Related U.S. Application Data

(60) Provisional application No. 62/701,152, filed on Jul. 20, 2018.

(51) Int. Cl.
*G05D 1/00* (2006.01)
*G01C 22/00* (2006.01)
(Continued)

(52) U.S. Cl.
CPC .............. *G08G 9/02* (2013.01); *B60W 10/04* (2013.01); *B60W 10/18* (2013.01); *B60W 10/20* (2013.01);
(Continued)

(58) Field of Classification Search
CPC combination set(s) only.
See application file for complete search history.

(56) References Cited

U.S. PATENT DOCUMENTS

| 5,812,395 A | 9/1998 | Masciangelo et al. |
| 6,058,344 A | 5/2000 | Rowe et al. |

(Continued)

FOREIGN PATENT DOCUMENTS

EP 0712697 5/1996

OTHER PUBLICATIONS

King-Hele, D., "Erasmus Darwin's Improved Design for Steering Carriages and Cars," *Notes and Records of the Royal Society of London*, 56(1):41-62, Jan. 2002.
(Continued)

*Primary Examiner* — Khoi H Tran
*Assistant Examiner* — Jorge O Peche
(74) *Attorney, Agent, or Firm* — Law Offices of John G. Posa

(57) ABSTRACT

Autonomous and manually operated vehicles are integrated into a cohesive, interactive environment, with communications to each other and to their surroundings, to improve traffic flow while reducing accidents and other incidents. All vehicles send/receive messages to/from each other, and from infrastructure devices, enabling the vehicles to determine their status, traffic conditions and infrastructure. The vehicles store and operate in accordance with a common set of rules based upon the messages received and other inputs from sensors, databases, and so forth, to avoid obstacles and collisions based upon current and, in some cases, future or predicted behavior. Shared vehicle control interfaces enable the AVs to conform to driving activities that are legal, safe, and allowable on roadways. Such activities enable each AV to drive within safety margins, speed limits, on allowed or
(Continued)

legal driving lanes and through allowed turns, intersections, mergers, lane changes, stops/starts, and so forth.

16 Claims, 5 Drawing Sheets

(51) Int. Cl.

| | | |
|---|---|---|
| G08G 9/02 | (2006.01) | |
| G05D 1/02 | (2020.01) | |
| B60W 10/20 | (2006.01) | |
| B60W 10/04 | (2006.01) | |
| B60W 10/18 | (2012.01) | |
| B60W 30/09 | (2012.01) | |
| H04W 4/38 | (2018.01) | |
| H04W 4/44 | (2018.01) | |
| H04W 4/02 | (2018.01) | |
| H04L 29/08 | (2006.01) | |
| H04W 4/46 | (2018.01) | |
| H04W 4/40 | (2018.01) | |

(52) U.S. Cl.
CPC ........... *B60W 30/09* (2013.01); *G05D 1/0088* (2013.01); *G05D 1/0212* (2013.01); *G05D 1/0246* (2013.01); *G05D 1/0257* (2013.01); *H04L 67/125* (2013.01); *H04W 4/02* (2013.01); *H04W 4/026* (2013.01); *H04W 4/027* (2013.01); *H04W 4/38* (2018.02); *H04W 4/44* (2018.02); *H04W 4/46* (2018.02); *B60W 2420/42* (2013.01); *B60W 2420/52* (2013.01); *B60W 2710/18* (2013.01); *B60W 2710/20* (2013.01); *G05D 2201/0212* (2013.01); *H04W 4/40* (2018.02)

(56) References Cited

U.S. PATENT DOCUMENTS

| | | | |
|---|---|---|---|
| 6,122,572 A | 9/2000 | Yavnai | |
| 6,131,067 A | 10/2000 | Girerd et al. | |
| 6,336,137 B1 | 1/2002 | Lee et al. | |
| 6,952,488 B2 | 10/2005 | Kelly et al. | |
| 7,096,116 B2 | 8/2006 | Tanaka et al. | |
| 7,376,262 B2 | 5/2008 | Hu et al. | |
| 7,440,585 B2 | 10/2008 | Roh et al. | |
| 7,769,487 B2 | 8/2010 | Ayers et al. | |
| 7,826,919 B2 | 11/2010 | D'Andrea et al. | |
| 7,850,413 B2 | 12/2010 | Fontana | |
| 7,873,469 B2 | 1/2011 | D'Andrea et al. | |
| 7,894,932 B2 | 2/2011 | Mountz et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,068,978 B2 | 11/2011 | D'Andrea et al. | |
| 8,078,338 B2 | 12/2011 | Pack et al. | |
| 8,170,711 B2 | 5/2012 | D'Andrea et al. | |
| 8,220,710 B2 | 7/2012 | Hoffman et al. | |
| 8,255,092 B2 | 8/2012 | Phillips et al. | |
| 8,265,873 B2 | 9/2012 | D'Andrea et al. | |
| 8,280,546 B2 | 10/2012 | D'Andrea et al. | |
| 8,280,547 B2 | 10/2012 | D'Andrea et al. | |
| 8,457,827 B1 | 6/2013 | Ferguson et al. | |
| 8,504,233 B1 | 8/2013 | Ferguson et al. | |
| 8,509,982 B2 | 8/2013 | Montemerlo et al. | |
| 8,521,352 B1 | 8/2013 | Ferguson et al. | |
| 8,527,113 B2 | 9/2013 | Yamauchi et al. | |
| 8,577,538 B2 | 11/2013 | Lenser et al. | |
| 8,655,536 B2 | 2/2014 | Peake et al. | |
| 8,655,537 B2 | 2/2014 | Ferguson et al. | |
| 8,676,430 B1 | 3/2014 | Ferguson et al. | |
| 8,700,251 B1 | 4/2014 | Zhu et al. | |
| 8,712,624 B1 | 4/2014 | Ferguson et al. | |
| 8,755,967 B1 | 6/2014 | Ferguson et al. | |
| 8,761,991 B1 | 6/2014 | Ferguson et al. | |
| 8,788,134 B1 | 7/2014 | Litkouhi et al. | |
| 8,818,681 B1 | 8/2014 | Dolgov et al. | |
| 8,818,682 B1 | 8/2014 | Dolgov et al. | |
| 8,825,259 B1 | 9/2014 | Ferguson | |
| 8,825,264 B2 | 9/2014 | Montemerlo et al. | |
| 8,825,265 B1 | 9/2014 | Ferguson et al. | |
| 8,831,813 B1 | 9/2014 | Ferguson et al. | |
| 8,843,244 B2 | 9/2014 | Phillips et al. | |
| 8,880,272 B1 | 11/2014 | Ferguson et al. | |
| 8,935,034 B1 | 1/2015 | Zhu et al. | |
| 8,954,194 B2 | 2/2015 | Allis et al. | |
| 8,965,561 B2 | 2/2015 | Jacobus et al. | |
| 9,026,300 B2 | 5/2015 | Ferguson | |
| 9,050,977 B1 | 6/2015 | Dolgov et al. | |
| 9,110,196 B2 | 8/2015 | Urmson et al. | |
| 9,110,471 B2 | 8/2015 | Pack et al. | |
| 9,120,484 B1 | 9/2015 | Ferguson et al. | |
| 9,120,485 B1 | 9/2015 | Dolgov | |
| 9,141,107 B2 | 9/2015 | Ferguson et al. | |
| 9,145,140 B2 | 9/2015 | Ferguson et al. | |
| 9,213,337 B1 | 12/2015 | Ferguson | |
| 9,216,737 B1 | 12/2015 | Zhu et al. | |
| 9,254,846 B2 | 2/2016 | Dolgov et al. | |
| 9,255,805 B1 | 2/2016 | Ferguson et al. | |
| 9,261,379 B1 | 2/2016 | Chatham et al. | |
| 9,261,879 B2 | 2/2016 | Ferguson et al. | |
| 9,268,332 B2 | 2/2016 | Montemerlo et al. | |
| 9,280,156 B1 | 3/2016 | Ferguson et al. | |
| 9,290,181 B1 | 3/2016 | Dolgov et al. | |
| 9,310,804 B1 | 4/2016 | Ferguson et al. | |
| 9,315,192 B1 | 4/2016 | Zhu et al. | |
| 9,330,571 B2 | 5/2016 | Ferguson et al. | |
| 9,336,436 B1 | 5/2016 | Dowdall | |
| 9,361,409 B2 | 6/2016 | Kozloski et al. | |
| 9,381,916 B1 | 7/2016 | Zhu et al. | |
| 9,381,917 B1 | 7/2016 | Dolgov et al. | |
| 9,381,918 B1 | 7/2016 | Ferguson et al. | |
| 9,384,666 B1 | 7/2016 | Harvey | |
| 9,429,947 B1 * | 8/2016 | Wengreen | B60W 30/06 |
| 9,459,625 B1 | 10/2016 | Ferguson et al. | |
| 9,494,943 B2 | 11/2016 | Harvey | |
| 9,495,874 B1 | 11/2016 | Zhu et al. | |
| 9,499,172 B2 | 11/2016 | Urmson et al. | |
| 9,511,767 B1 | 12/2016 | Okumura et al. | |
| 9,513,634 B2 | 12/2016 | Pack et al. | |
| 9,523,984 B1 | 12/2016 | Herbach et al. | |
| 9,561,797 B2 | 2/2017 | Dolgov et al. | |
| 9,573,592 B2 | 2/2017 | Prokhorov et al. | |
| 9,576,083 B2 | 2/2017 | Kozloski et al. | |
| 9,580,080 B1 | 2/2017 | Letwin et al. | |
| 9,663,047 B2 | 5/2017 | Bande Martinez et al. | |
| 9,669,872 B2 | 6/2017 | Rebhan et al. | |
| 9,671,784 B1 | 6/2017 | Dolgov et al. | |
| 9,672,446 B1 | 6/2017 | Vallespi-Gonzalez | |
| 9,707,966 B2 | 7/2017 | Herbach et al. | |
| 9,713,983 B2 | 7/2017 | Takaki et al. | |
| 9,715,711 B1 * | 7/2017 | Konrardy | G08G 1/167 |
| 9,734,455 B2 | 8/2017 | Levinson et al. | |
| 9,766,626 B1 | 9/2017 | Zhu et al. | |
| 9,779,314 B1 | 10/2017 | Wendel et al. | |
| 9,796,421 B1 | 10/2017 | Gupta | |
| 9,821,807 B2 | 11/2017 | Herbach et al. | |
| 9,862,364 B2 | 1/2018 | Fairfield | |
| 9,880,557 B1 | 1/2018 | Dolgov et al. | |
| 9,881,503 B1 * | 1/2018 | Goldman-Shenhar | G08G 1/166 |
| 9,892,332 B1 | 2/2018 | Wendel et al. | |
| 9,896,101 B2 | 2/2018 | Kato | |
| 9,910,439 B1 | 3/2018 | Ferguson et al. | |
| 9,915,947 B1 | 3/2018 | LaForge et al. | |
| 9,932,035 B1 | 4/2018 | Ferguson et al. | |
| 9,952,054 B2 * | 4/2018 | An | G01C 21/34 |
| 9,964,952 B1 | 5/2018 | Costa et al. | |
| 9,989,967 B2 | 6/2018 | Jacobus et al. | |
| 9,990,548 B2 | 6/2018 | Wellington et al. | |
| 10,005,460 B2 | 6/2018 | Gutmann et al. | |
| 10,012,991 B1 | 7/2018 | Ferguson et al. | |
| 10,019,005 B2 | 7/2018 | Wang et al. | |

(56) References Cited

U.S. PATENT DOCUMENTS

| | | | |
|---|---|---|---|
| 10,019,011 B1 | 7/2018 | Green et al. | |
| 10,042,359 B1* | 8/2018 | Konrardy | B60W 30/12 |
| 10,086,782 B1* | 10/2018 | Konrardy | B60W 30/16 |
| 10,268,192 B1* | 4/2019 | Wengreen | G06Q 50/30 |
| 10,272,827 B1* | 4/2019 | Kemler | G05D 1/0088 |
| 10,299,216 B1* | 5/2019 | Wengreen | B60L 58/12 |
| 10,310,505 B1* | 6/2019 | Hanson | G05D 1/0088 |
| 10,310,515 B2* | 6/2019 | Harvey | G05D 1/0295 |
| 10,332,396 B1* | 6/2019 | Christensen | B60W 30/10 |
| 10,346,797 B2 | 7/2019 | Jacobus et al. | |
| 10,459,453 B2 | 10/2019 | Jacobus et al. | |
| 10,602,331 B2* | 3/2020 | Takii | B60Q 1/268 |
| 2004/0015266 A1 | 1/2004 | Skoog | |
| 2004/0093650 A1 | 5/2004 | Martins et al. | |
| 2007/0018811 A1 | 1/2007 | Gollu | |
| 2008/0262669 A1 | 10/2008 | Smid et al. | |
| 2008/0290618 A1* | 11/2008 | Yanaka | B60G 17/0161 280/6.15 |
| 2010/0104199 A1* | 4/2010 | Zhang | G08G 1/165 382/199 |
| 2013/0231824 A1* | 9/2013 | Wilson | G01C 21/3415 701/26 |
| 2014/0195093 A1 | 7/2014 | Litkouhi et al. | |
| 2014/0195213 A1 | 7/2014 | Kozloski et al. | |
| 2014/0195214 A1 | 7/2014 | Kozloski et al. | |
| 2014/0277901 A1 | 9/2014 | Ferguson et al. | |
| 2015/0012167 A1 | 1/2015 | Wolter | |
| 2015/0029014 A1 | 1/2015 | Bande Martinez et al. | |
| 2015/0100192 A1* | 4/2015 | Lee | G05D 1/0293 701/23 |
| 2015/0134180 A1 | 5/2015 | An et al. | |
| 2015/0219464 A1* | 8/2015 | Beaurepaire | G01C 21/3438 701/538 |
| 2015/0242944 A1* | 8/2015 | Willard | G06Q 30/0284 705/5 |
| 2015/0308837 A1* | 10/2015 | Cudak | G01C 21/26 701/23 |
| 2015/0321699 A1 | 11/2015 | Rebhan et al. | |
| 2015/0332563 A1* | 11/2015 | Davis | G01S 19/13 342/66 |
| 2015/0353082 A1* | 12/2015 | Lee | B60W 30/10 701/41 |
| 2016/0167653 A1 | 6/2016 | Malone et al. | |
| 2016/0171894 A1 | 6/2016 | Harvey | |
| 2016/0176397 A1 | 6/2016 | Prokhorov et al. | |
| 2016/0187885 A1 | 6/2016 | Pack et al. | |
| 2016/0231746 A1* | 8/2016 | Hazelton | B60W 30/00 |
| 2016/0257309 A1* | 9/2016 | Kumar | B60W 30/181 |
| 2016/0274590 A1 | 9/2016 | Harvey | |
| 2016/0311431 A1 | 10/2016 | Kato | |
| 2017/0032067 A1 | 2/2017 | Kozloski et al. | |
| 2017/0038777 A1 | 2/2017 | Harvey | |
| 2017/0080900 A1* | 3/2017 | Huennekens | B60W 40/08 |
| 2017/0097640 A1 | 4/2017 | Wang et al. | |
| 2017/0102701 A1 | 4/2017 | Pack et al. | |
| 2017/0123423 A1 | 5/2017 | Sako et al. | |
| 2017/0124476 A1* | 5/2017 | Levinson | G01S 17/86 |
| 2017/0139411 A1 | 5/2017 | Hartung et al. | |
| 2017/0168809 A1 | 6/2017 | Zander | |
| 2017/0174221 A1 | 6/2017 | Vaughn et al. | |
| 2017/0213165 A1* | 7/2017 | Stauffer | G06Q 10/02 |
| 2017/0223046 A1* | 8/2017 | Singh | H04L 63/1491 |
| 2017/0227964 A1* | 8/2017 | Lehtiniemi | G08G 1/00 |
| 2017/0267256 A1 | 9/2017 | Minster et al. | |
| 2017/0278390 A1* | 9/2017 | Zydek | B60W 30/00 |
| 2017/0291638 A1 | 10/2017 | Gupta | |
| 2017/0300053 A1* | 10/2017 | Wengreen | G08G 1/202 |
| 2017/0305434 A1 | 10/2017 | Ratnasingam | |
| 2017/0316333 A1 | 11/2017 | Levinson et al. | |
| 2017/0320500 A1 | 11/2017 | Yoo et al. | |
| 2017/0327082 A1* | 11/2017 | Kamhi | B60R 25/102 |
| 2017/0349184 A1* | 12/2017 | Tzirkel-Hancock | B60W 50/08 |
| 2017/0364069 A1 | 12/2017 | Colella et al. | |
| 2018/0004223 A1 | 1/2018 | Baldwin | |
| 2018/0012492 A1* | 1/2018 | Baldwin | G05D 1/0261 |
| 2018/0056851 A1* | 3/2018 | Kim | G05D 1/0088 |
| 2018/0074513 A9 | 3/2018 | Harvey | |
| 2018/0086336 A1 | 3/2018 | Jones et al. | |
| 2018/0118219 A1 | 5/2018 | Hiei et al. | |
| 2018/0130161 A1* | 5/2018 | Wengreen | G05D 1/0027 |
| 2018/0136655 A1* | 5/2018 | Kim | H04W 4/44 |
| 2018/0141544 A1 | 5/2018 | Xiao et al. | |
| 2018/0188039 A1 | 7/2018 | Chen et al. | |
| 2018/0188040 A1 | 7/2018 | Chen et al. | |
| 2018/0188041 A1 | 7/2018 | Chen et al. | |
| 2018/0188042 A1 | 7/2018 | Chen | |
| 2018/0188043 A1 | 7/2018 | Chen et al. | |
| 2018/0201182 A1 | 7/2018 | Zhu | |
| 2018/0203454 A1* | 7/2018 | Aoki | B60W 30/09 |
| 2018/0203461 A1* | 7/2018 | Yokokawa | G06K 9/00798 |
| 2018/0208199 A1* | 7/2018 | Fujita | G08G 1/16 |
| 2018/0211532 A1* | 7/2018 | Aoki | G06F 16/29 |
| 2018/0211541 A1* | 7/2018 | Rakah | G08G 1/005 |
| 2018/0218601 A1* | 8/2018 | Aoki | B60W 40/04 |
| 2018/0232639 A1* | 8/2018 | Lin | G06N 3/063 |
| 2018/0329418 A1* | 11/2018 | Baalke | G08G 1/09623 |
| 2018/0356838 A1* | 12/2018 | Schmidt | G05D 1/0293 |
| 2019/0019133 A1* | 1/2019 | Allen | G06Q 10/1053 |
| 2019/0051179 A1* | 2/2019 | Alvarez | H04W 4/46 |
| 2019/0086916 A1* | 3/2019 | Choi | B60W 50/087 |
| 2019/0122540 A1* | 4/2019 | Ishikawa | G08G 1/0112 |
| 2019/0184981 A1* | 6/2019 | Jung | G06K 9/00812 |
| 2019/0193749 A1* | 6/2019 | Choi | H04W 4/80 |
| 2019/0215671 A1* | 7/2019 | Takii | B60Q 1/50 |
| 2019/0367036 A1* | 12/2019 | Brombach | G06K 9/00832 |
| 2020/0001890 A1* | 1/2020 | Kline | G06T 11/60 |

OTHER PUBLICATIONS

Lozowy, D., "Inventor of the Tractor", Citation http://ricolor.org/history/eng/pm/blinov. Patented in US in 1913 by B. Holt, Patent 1076576. Citation only, http://en.wikipedia.org.wiki/Benjamin_Holt.

Dickmanns, E.D. et al., "Guiding Land Vehicles Along Roadways by Computer Vision," *Congres Automatique (1985: Toulouse, France). The tools for tomorrow*, 1985; Overview of Dickmann's early work in automated driving.

Lowrie, J.W. et al. "The Autonomous Land Vehicle (ALV) Preliminary Road-following Demonstration," Proc. SPIE, vol. 579, 1985. Overview of the entire ALV includes elements from JADI disclosure, Martin-Marietta (prime contractor) view.

Kanade, T. et al., "Autonomous Land Vehicle Project at CMU," Proceedings of the 1986 ACM *Fourteenth Annual Conference on Computer Science*. ACM, 1966. Overview of the entire ALV includes elements from JADI disclosure. CMU view, includes Ladar stuff.

Shafer, S. et al., "An Architecture for Sensor Fusion in a Mobile Robot," *Robotics and Automation, Proceedings, 1986 IEEE International Conference on*. vol. 3. IEEE, 1986.

Nasr, H. et al., "Guiding an Autonomous Land Vehicle Using Knowledge-based Landmark Recognition," Proceedings of the DARPA Image Understanding Workshop, 1987.

Turk, M. et al., "Video Road-following for the Autonomous Land Vehicle," *Robotics and Automation, Proceedings, 1987 IEEE International Conference on* vol. 4, IEEE, 1987. Overview of automated driving for ALV.

Waxman, A. et al., "A Visual Navigation System for Autonomous Land Vehicles," *Robotics and Automation, IEE* Journal of 3.2 (1987): 124-141. Overview of automated driving for ALV.

Asada, M., "Building a 3D World Model for Mobile Robot from Sensory Data," *Robotics and Automation, 1988, Proceedings.*, 1988 IEEE International Conference on. IEEE, 1988.

Daily, M. et al., "Autonomous Cross-country Navigation with the ALV," *Robotics and Automation, 1988. Proceedings*, 1988 IEEE Conference on. IEEE, 1988. Includes LADAR stuff.

Dickmanns, E. et al., "Autonomous High Speed Road Vehicle Guidance by Computer Vision," International Federation of Auto-

(56) References Cited

OTHER PUBLICATIONS matic Control. World Congress (10th). Automatic control: World Congress, vol. 1, 1988. Overview of Dickman's early work in automated driving.
Dunlay, R., "Obstacle Avoidance Perception Processing for the Autonomous Land Vehicle," Robotics and Automation, 1988. Proceedings, 1988 IEEE International Conference on IEEE, 1988.
Turk, M. et al., "VITS-A Vision System for Autonomous Land Vehicle Navigation." Pattern Analysis and Machine Intelligence, IEEE Transactions on 10.3 (1988): 342-361.
Everett, H.R. et al., "Survey of Collision Avoidance and Ranging Sensors for Mobiie Robots. Revision 1," No. NCCOSC/RDT/E-1994-REV-1. Naval Command Control and Ocean Surveillance Center RDT an E Div San Diego CA, 1992.
Chun, W. et al., "Unmanned Ground Vehicle Demo II: Demonstation A," Photonics for Industrial Applications, *International Society for Optics and Photonics*, 1995.
Carmer, D. et al., "Laser Radar in Robotics," Proceedings of the IEEE 84.2 (1996): 299-320.
Garibotto, G. et al., "Computer Vision Control of an Intelligent Forklift Truck," Intelligent Transportation System, 1997. ITSC '97., IEEE Conference on IEEE, 1997.
Larsen, T. et al., "Location Estimation for an Autonomously Guided Vehicle Using and Augmented Kalman Filter to Autocalibrate the Odometry," FUSION98 Spie Conference, 1998.
Garibotto, G. et al., "Industrial Exploitation of Computer Vision in Logistic Automation; Autonomous Control of an Intelligent Forklift Truck," Robotics and Automation, *Proceedings IEEE International Conference* on. vol. 2, IEEE, 1996.
Kelly, A. et al., "Rough Terrain Autonomous Mobility-part 2: An Active Vision, Predictive Control Approach," *Autonomous Robots* 5.2 (1998): 163-198.
Matsumara, J. et al., "Lightning Over Water: Sharpening America's Light Forces for Rapid Reactin Missions," Appendix D: Robotics: Augmenting the Soldier?, Rand Corporation Report, MR-1196-A/OSD, 0-8330-2845-6, 2000.
Pages, J. et al., "A Computer Vision System for Autonomous Forklift Vehicles in Industrial Environments," *In Proc. of the 9th Mediterranean Conference on Control and Automation MEDS*, vol. 2001, 2001.
Pages, J. et al., "An Accurate Pallet Pose Estimation for Guiding Autonomous Forklift Vehicles," Proc. of WESIC 2001, Univ. of Twente, The Netherlands, Jun. 27-29, 2001.
Seelinger, M. et al., "Automatic Visual Guidance of a Forklift Engaging a Pallet," *Robotics and Autonomous Systems* 54.12 (2006):1026-1038.
Shoemaker, C., "Development of Autonomous Robotics Ground Vehicles: DoD's Ground Robotics Research Programs: Demo I though Demo III," *Intelligent Vehicle Systems: A 4D/RCS Approach* (2006): 283.
Bouguerra, A. et al., "An Autonomous Robotic System for Load Transportation," *Emerging Technologies & Factory Automation, 2009. IEEE Conference on*. IEEE. 2009.
Moore, D. et al., "Stimultaneous Local and Global State Estimation for Robotics Navigation," *Robotics and Automation, 2009. ICRA '09. IEEE International Conference on*. IEEE, 2009.
Tamba, T. et al., "A Path Following Control of an Unmanned Autonomous Forklift," *International Journal of Control, Automation and Systems* 7.1 (2009): 113-122.
Furmans. K. et al., "Plug-and-Work Material Handling Systems," 2010 International Material Handling Research Colloquium, Milwaukee, USA. 2010.
Correa, A. et al., "Multimodal Interaction with an Autonomous Forklift," Human-Robot Interaction (HRI), 2010 5th ACM/IEEE International Conference on. IEEE, 2010.
Cui, G. et al., "A Robust Autonomous Mobile Forklift Pallet Recognition," Informatics in Control, Automation and Robotics (CAR), 2010 2nd International Asia Conference on vol. 3, IEEE, 2010.

Walter, M. et al., "Clsoed-loop Pallet Engagement in an Unstructured Environment," Proceedings of the IEEE International Conference on Robotics and Automation (ICRA) Workshop on Mobile Manipulation, Anchorage, Alaska. May 2010.
Kollar, T. et al., "Towards Understanding Hierachical Natural Language Commands for Robotics Navigation and Manipulation," MIT-CSAIL-TR-2011-007. Feb. 1, 2011.
Song, Y. et al., "Implementation of Distributed Architecture Based on CAN Networks for Unmanned Forklift," *IECON 2011-37th Annual Conference on IEEE Industrial Electronics Society*. IEEE. 2011.
Widyotriatmo, A. et al., "Navigation Function-based Control of Multiple Wheeled Vehicles," *Industrial Electronics. IEEE Transactions on*58.5 (2011): 1896-1906.
Widyotriatmo, A. et al., "Control Architecture of Material Handling Vehicles," *Instrumentation Control and Automation(ICA), 2011 2nd International Conference on*. IEEE, 2011.
"ARToolKit is a Software Library for Building Augmented Reality (AR) applications," Human Interface Technology Laboratory (HIT Lab) at the University of Washington, http://www.hitl.washington.edu/artoolkit/ Dec. 25, 2012.
Gage, D.W. "UGV History 101: A Brief History of Unmanned Ground Vehicle (UGV) Development Efforts," Special Issue on Unmanned Ground Vehicles, Unmanned Systems Magazine, vol. 13, No. 3, Summer 1995.
Lecking, D. et al., "The RTS-STILL Robotic Fork-Lift," EURON Technology Transfer Award.
BBC, How to drive in snow and icy weather, <http://www.bbc.co.uk/news/uk-16946762>, Jan. 11, 2013.
BBC, Stopping Distances, <http://www.bbc.co.uk/schools/gcsebitesize/science.ass_aqa-pre_2011/forces/weightfrictionrev3.shtml>, Feb. 3, 2014.
Burlingame, Liz, Rave is on the Build Self-Driving Cars, Dec. 2, 2013, The Weather Channel, <http://www.weather.com/news/science/self-driving-cars-are-less-20-year-away-say-automakers-20131124>.
CyberPhysics.co.uk, Stopping Distance, <http://www.cyberphysics.co.uk/topics/forces/stopping_distance.htm>, Feb. 3, 2014.
DARPA Grand Challenge, Urban Challenge Route Network Defintion File (RNDF) an Mission Definition File (MDF) Formats, May 12, 2006, Defense Advanced Projects Agency, 3701 North Fairfax Drive, Arlington, VA 22203-1714, Updated Feb. 13, 2007.
DARPA Grand Challenge, Urban Challenge, Rules, Jun. 12, 2006, Defense Advanced Projects Agency, 3701 North Fairfax Drive, Arlington, VA 22203-1714, Updated Mar. 15, 2007.
DARPA Grand Challege, Urban Challenge, Urban Challenge Site Visit Guidelines, Jan. 16, 2007, Defense Advances Projects Agency, 3701 North Fairfax Drive, Arlington, VA 22203-1714, Updated Feb. 26, 2007.
DARPA Grand Challenge, Urban Challenge, Urban Challenge Technical Evaluation Criteria, Mar. 16, 2006, Defense Advanced Projects Agency, 3701 North Fairfax Drive, Arlington, VA 22203-1714, Updated Jun. 12, 2006.
Estes, Adam Clark, What is Keeping Self-Driving Cars Off the Road?, Gizmodo, Oct. 25, 2013, http://www.gizmodo.com/au/2013/10/whats-keeping-self-driving-cars-off-the-road.
Gehrig, S. et al., Priors for Stereo Vision under Adverse Weather Conditions, ICCV 2013 Workshop paper, Computer Vision Foundation, IEEE Explore, pp. 238-245.
Gern, A. et al., Vision-based lane recognition under adverse weather conditions using optical flow, DaimlerChrysler Res. & Technol., Stuttgart, Germany: Intelligent Vehicle Symposium, IEEE, Jun. 17-21, 2002.
Larson, J. et al. Lidar based off-road negative obstacle detection and analysis, Intelligent Transportation Systems (ITSC) 2011 14th International IEEE Conference on, IEEE, 2011.
Murray, C., Feds: Autonomous Cars Not Ready for Prime Time, design news, Jun. 7, 2013, <http://www.designnews.com/author.asp?section_id=1395&doc_id=264251>.
Queensland Australia, Stopping distances (Department of Transportation and Main Roads, <http://www.tmr.gld.gov.au/Safety/Driver-guide/Speeding/Stopping-distances.aspx>, Feb. 3, 2014.

(56) References Cited

OTHER PUBLICATIONS

Reid, L., CMU Researchers Unveil Self-Driving Cadillac, 90.5 WESA, Pittsburg NPR News station, Sep. 4, 2013, <http://wesa.fm/post/cmu-researchers-unveil-self-driving-cadillac>.

US Federal Highway Administration, Shortest stopping distance, <http://safety.fhwa.dot.gov/ped_bike/ped_transit/ped_transguide/ch4.cfm>, Feb. 3, 2014.

Winterservice, De-icing in snow, <http://www.de-icing.eu/en/winterservice/index.html>, Feb. 3, 2014.

Connected Vehicles: Benefits, Roles, Outcomes, U.S. Dept. of Transportation, Downloaded 2018.

Surface Vehicle Recommended Practice, SAE International, 2016.

Self-Driving Cars Are Headed Toward an AI Roadblock, the Verge, Brandom, Russell, 2018.

Autonomous Vehicle Safety Myths and Facts, Piekniewski's Blog, 2018 Update.

\* cited by examiner

AUTONOMOUS TRANSPORTATION SYSTEM AND METHODS

REFERENCE TO RELATED APPLICATIONS

This invention application claims priority to, and the benefit of, U.S. Provisional Patent Application Ser. No. 62/701,152, filed Jul. 20, 2018, the entire content of which is incorporated herein by reference.

FIELD OF THE INVENTION

This invention relates generally to autonomous vehicles (AVs) and, in particular, to autonomous driving systems (ADS) that support autonomous transportation with digital highways and infrastructure to achieve ultimate safety goals and fail-safe operation.

BACKGROUND OF THE INVENTION

Autonomous driving is actually not that new. The enabling technology for sophisticated, human-capable vehicle robotics has been developed over the last 30 years, beginning with the pioneering work done in the Autonomous Land Vehicle (ALV) program funded by DARPA starting in the early 1980s. The earliest work was done at Carnegie-Mellon University, the Environmental Research Institute of Michigan, MIT, Stanford Research Institute, and others, integrated into the DARPA Autonomous Land Vehicle prototype by Martin Marietta in Denver.

Lowrie [1985] provides a good overview of the ALV and describes a vehicle control substantially the same as disclosure Smid et al. U.S. Patent Application 20080262669 [2008]. Kanade, Takeo, Thorpe, and Whittaker [1986] describe CMU contributions to ALV, which include a description of using 3D LADAR developed by ERIM as instrumental in obstacle detection and avoidance. Carmer, et al. [1996] reviews this technology from the perspective of 10 years of further work and understanding. Shafer, Stentz, and Thorpe [1986], Nasr, Bhanu, and Schaffer [1987]. Turk et al, [1987], Waxman et al. [1987], Asada [1988], Daily [1988], Dunlay [1988], and Turk et al. [1988] describe ALV and Navlab (a robotic vehicle developed in parallel to ALV as a Carnegie-Mellon testbed) basic architecture and parts of an autonomous driving vehicle, including roadway identification and following (lane keeping), path planning and re-planning, obstacle detection and avoidance (heavily dependent upon 3D laser radar data or 3D computer vision to capture the three dimensional nature of obstacles), automotive controls (electric steer, speed control, etc.) and vehicle location (inertial and later GPS-based location estimation). This work discloses essentially all the features and architecture of subsequent work up through that reported in the DARPA Urban Challenge (2007 and 2008) and work presently being conducted by Google.

The Wikipedia article "Autonomous Car" (per Dec. 23, 2012 see http://en.wikipedia.org/wiki/Autonomous_car and DARPA maintained Urban Challenge archive at http://archive.darpa.mil/grandchallenge/) provides a good alternative overview of this prior art. This technology demonstrated inertial localization fused with GPS for self-location of vehicles, path planning from a map database, path plan to path execution through a vehicle control interface, and various vehicle-to-vehicle, and vehicle-to-infrastructure behaviors (passing, obstacle avoidance, speed limits, lane keeping, lane change prohibition segments, right-of-way, pass-through and n-way stop intersections, traffic circles, open area navigation, parking, speed pacing/spacing maintenance to a lead vehicle, u-turns, re-planning when routes are determined to be blocked). The salient aspect of this prior work is that it assumed good weather conditions (typically indoor testing and outdoor testing or demonstrations in dry clear weather, sometimes in the day and night, but not in rain, snow, or flooded conditions).

Later programs that followed ALV include Army Demo I, DARPA Demo II, and again Army Demo III. While the automated driving built under these programs improved, this improvement was less conceptual innovation and more that the base technology in 3 dimensional imaging, GPS, computing power, and open terrain path planning substantially improved so earlier architecture could be more successfully realized. These programs are review by Shoemaker [2006], the government's program manager for Demo I, part of Demo II, and initially Demo III—also by and Matsumura et al. [2000]. Demo II (circa 1996) and III (circa 2001) included all aspects of a modern self-driving vehicle, including GPS/Inertial navigation, 3D computer vision and ladar obstacle detection and avoidance, route planning based on mission maps, WiFi-like radio network operated telemetry, and vehicle controls by wire (electronic speed, steering and other vehicle function controls).

Everett et al. [1992], Chun et al. [1995], and Carmer et al. [1996] specifically describe aspects of how path planning, obstacle detection, and collision avoidance were done in these programs. In parallel to the work done in the US, German and EU funded work beginning with the pioneering high speed roadway driving demonstrations by Dickmanns et. al. [1985] and later in the 1980s show this technology in the civilian setting on German roadways (in contrast to the ALV and Demos I-III work in the US which focused on off-road and over less developed roads). The Army and DARPA Demos I, II, and III focused on off-road driving, but also in dry and favorable weather conditions. The European work focused more on road and lane driving, but also during good weather conditions.

Perhaps the capstone in the effort to develop automated vehicles was the well publicized DARPA Grand Challenges, culminating in 2007 with the Urban Challenge [DARPA 2007]. In this highly publicized challenge, 35 semifinalist were test in Victorville, Calif. in November of 2007. Over twenty substantially met DARPA's automated driving criteria which included California driving rules [DARPA Rules Section 5.5.1], speed limit controlled driving [DARPA Rules Section 1.7 "adherence to speed limits"], proper lane position keeping [DARPA Rules Section 1.7 "Follow paved and unpaved roads and stay in lane"], proper position relative to other vehicles on the road [DARPA Rules Section 1.7 "Change lanes safely when legal and appropriate, such as when passing a vehicle or entering an opposing traffic lane to pass a stopped vehicle. Vehicles must not pass other vehicles queued at an intersection" and DARPA Rules 5.2.3, B.4 "maintaining a minimum spacing equal to the forward vehicle separation distance"], proper right of way behavior at intersections [DARPA Rules 5.2.3 B2. "Intersection precedence," 5.2.5 D.2 "Merge," and D.4 "Left turn"], speed merge and passing [DARPA Rules 5.2.2 A.10 "Leaving lane to pass" and A11. "Returning to lane after passing"], general route planning to a mission specification [DARPA Rules 5.2.4 C4 "Dynamic Planning"], route execution with dynamic obstacle detection and avoidance [DARPA Rules C.2 "demonstrates ability to negotiate obstacle field safely"], and operating under conditions of variable or non-performance of GPS [DARPA Rules 5.2.4 C.6 "GPS Outage"].

Demonstrations in California in 2007 were performed by over 20 teams, but were also in dry dessert weather conditions (no snow, running water, ice, or fog/dust). This was a milestone showing that practical applications of human-safe automated driving were possible at the current state of the art (circa 2007). Later disclosures describe versions of the basic AV architecture, controls, and lane/path planning and obstacle detection behaviors originally disclosed in the suite of papers published by teams that participated in the DARPA Urban Challenge (per http://archive.darpa.mil/grandchallenge/), Ferguson, et al. (U.S. Pat. Nos. 8,457,827, 8,504,233, 8,655,537, 8,676,430, 8,712,624, 8,755,967, 8,825,259, 8,825,265, 8,831,813, 8,880,272, 9,026,300, 9,120,484, 9,255,805, 9,261,879, 9,280,156, 9,310,804, 9,330,571, 9,381,918, 9,459,625, 9,910,439, 9,932,035, and U.S. Ser. No. 10/012,991), Zhu, et al., (U.S. Pat. Nos. 8,700,251, 9,216,737, 9,315,192, 9,381,916, 9,495,874, and 9,766,626), Dolgov (U.S. Pat. Nos. 9,120,485, 9,254,846, 9,381,917, and 9,561,797), Herbach, et al. (U.S. Pat. Nos. 9,523,984, 9,707,966, and 9,821,807), Litkouhi, et al. (U.S. Pat. No. 8,788,134), Dowdall (U.S. Pat. No. 9,336,436), Prokhorov, et al. (U.S. Pat. No. 9,573,592), Letwin, et al. (U.S. Pat. No. 9,580,080), Vallespi-Gonzalez (U.S. Pat. No. 9,672,446), Kato (U.S. Pat. No. 9,896,101), Costa, et al. (U.S. Pat. No. 9,964,952), and Wang, et al. (U.S. Ser. No. 10/019,005).

FIG. 1 shows an autonomous vehicle (AV) incorporating systems and subsystems that have been disclosed in the literature. The vehicle includes:

(1) An AV controller 100 in communication with set of vehicle control interfaces, including steering control 102; dashboard with HCl (human-computer interface) controls 104; speed (brake, acceleration) and transmission controls 106. The AV controller may interface with a transceiver 101 facilitating Vehicle-to-Vehicle (V2V), Vehicle-to-Infrastructure (V2I) and Vehicle-to-Pedestrian (V2P) communications. A control bus 103 (i.e., CAN) is typically used to communicate with body and vehicle controls, and a sensor bus 105 is used to interface with various sensor sets as described below;

(2) A sensor set and associated hardware and software 110 for tracking the vehicle's location in the world (over Earth) to a several centimeter accuracy. This sensor set facilitates self-location using one or more of lane marker detection, GPS, 3D point cloud measurements and matching, inertial measurements, map-based correction and wheel or speed measurement;

(3) A sensor set for detecting obstacles and placing detections into a world 3D model to support collision detection and avoidance. This sensor set may include front-facing 120, rear-facing 122, right rear 124, left rear 126 right front/cross-traffic 128 and left front/cross traffic 130 video and range sensors, which may include LADAR/LIDAR, RADAR, raining or stereo computer vision, object recognition generally, image learning algorithms, etc.;

(4) In terms of software, a planner generates paths from a starting point to one or more destinations or intermediary points employing terrain and/or road maps (graphs of encoded in databases); and (5) A path execution system generates vehicle controls (speeds, steering, braking, signals, user or drive feedback like speedometers, etc.) based on paths generated and data items attached to the paths (from the maps) that indicate certain behaviors in proximity to locations along the paths (i.e. stop signs, speed limits, lane change prohibitions, or specific tasks executed by AV payloads along the paths).

The AV systems and subsystems illustrated in FIG. 1 have been well described in various references and other compendiums of open literature prior art developed in the 1980 to the DARPA Urban Challenge in 2007. Exceptions, however, include the V2V/V2I, and V2P messaging interfaces. Whereas previous work has focused on specific behaviors or attributes of the single AV or how the single AV will behave relative to surrounding infrastructure (i.e., intersections) and proximal/other vehicles sensed by its own internal set of sensors, there is an outstanding need to fuse existing on-board AV systems with environmental interfaces to achieve a system and method of autonomous transportation involving multiple vehicles and their surroundings, not just isolated AV control.

SUMMARY OF THE INVENTION

This invention improves upon the prior art by integrating autonomous vehicles—and non-autonomous vehicles—into a cohesive, interactive environment, with communications to each other and to their surroundings, to improve traffic flow while reducing accidents and other problems.

Autonomous vehicles (AVs) and manually operated vehicles (MVs) send/receive messages to/from each other and from infrastructure devices, enabling the AVs and MVs to determine the status of other vehicles, traffic conditions and infrastructure in their vicinity. "Status" in this context includes the current "state" of vehicles and surrounding infrastructure, such as position, speed, orientation, and possibly other factors such as turn rate, traffic directions, intersection conditions, blocked lanes, and so forth.

The AVs and MVs share common modules, enabling the vehicles to co-exist in a fail-safe manner. The AVs and MVs store and operate in accordance with a common set of rules based upon the messages received and other inputs from sensors, databases, and so forth, to avoid obstacles and collisions based upon current and, in some cases, future or predicted behavior. Shared vehicle control interfaces enable the AVs to conform to driving activities that are legal, safe, and allowable on roadways. Such activities enable each AV to drive within safety margins, speed limits, on allowed or legal driving lanes and through allowed turns, intersections, mergers, lane changes, stops/starts, and so forth.

The above-described operation is achieved with various sensor sets and control subsystems that adhere to path planning and execution guidelines. A self-location sensor set and tracking subsystems determine the vehicle's location in the world (over Earth), preferably to an accuracy in the centimeter range. Such sensor may include, without limitation, GPS, 3D point cloud measurements and matching, inertial measurements, wheel or speed measures, and so forth as described herein. A sensor set is also provided for detecting obstacles and placing detections into a world 3D model to support collision detection and avoidance. These sensors may include, without limitation, LADAR/LIDAR, RADAR, optical, ranging or stereo computer vision, object recognition generally, image learning algorithms, and so forth as described herein.

A planner, operative to generate paths from a starting point to one or more destinations, or intermediary points, employs terrain and/or road maps (graphs of encoded in databases). A path execution subsystem includes generating vehicle controls (speeds, steering, braking, signals, user or drive feedback like speedometers, etc.) based on paths generated. Data items attached to the paths (from the maps) indicate certain behaviors in proximity to locations along the paths (i.e., stop signs, speed limits, lane change prohibitions, or specific tasks executed by AV payloads along the paths).

Comprehensive communications capabilities provide messaging between proximate AV or manual vehicles, infrastructure, pedestrians and any other active moving object in the driving environment. Such communications capabilities may include, without limitation, the transmission and/or reception of radio encodings and common message packets over common radio-frequency bands. Messages may include information regarding status, location, speed, direction, and other planned intent to proximal vehicles, pedestrians and/or other moving entities or objects in the driving environment. Thus, in addition to anticipated or normal driving operation, on-board processing electronics uses inputs from the sensor(s) and surroundings-to-vehicle information to allow for lateral deviation from a planned path due to obstacles (other vehicles, pedestrians, or road obstacles large enough to interfere with smooth driving) and road issues (construction, detours, lane shifts, etc.).

In the preferred embodiment, manually operated vehicles are provided with some or all of the same subsystems used by the AVs to control driving activities that are legal, safe, and allowable on roadways; that is, to drive within safety margins, speed limits, on allowed or legal driving lanes and through allowed turns, intersections, mergers, lane changes, stops/starts, and so forth. Manually driven vehicles are also equipped with communications capabilities enabling messaging between proximate AV or manual vehicles, infrastructure, pedestrians and other stationary/active moving object in the driving environment. As with the AVs, such communications capabilities may include, without limitation, the transmission and/or reception of radio encodings and common message packets over common radio-frequency bands. Messages may again include information regarding status, location, speed, direction, and other planned intent to proximal vehicles, pedestrians and/or other moving entities or objects in the driving environment.

Broadly, vehicle control interfaces on both AVs and non-AVs impose operational behavior that is legal, safe, and allowable on the roadways, in a way which harmonizes with other manual vehicles, AVs, and the surrounding environment, including infrastructure and pedestrians. Active traffic infrastructure elements are preferably provided to achieve this goal. Such elements may include hardware/software supporting logic to implement traffic flow directives through intersections, around work areas, over sections of the roadway or lanes, at specific points along the roadway, and the like. As with vehicle-to-vehicle communications, infrastructure-to-vehicle messaging may use transmission/reception of radio encodings and message packets over available radio-frequency bands. Optionally, active or passive localization and/or messaging tagging tags or devices may be worn or carried by pedestrians or other roadway/vehicle protected objects in proximity to the roadway or driving environment for further safe/fail-safe operation.

The combinations of systematic controls support a wide range of driving and transportation activities, including utility functions and non-standard behaviors at stops or destination points. As examples, AVs may identify, pick-up and place or drop persons or groups, as well as various payloads, including pallets, containers, packages, groceries, propane tanks, garbage, etc. AVs according to the invention may enter a garage or scan a parking area or street side, identify a parking spot and negotiate vehicle parking. Other capabilities include backing up to trailers, boats, and the like to affect coupling, towing, controlled drop off and detachment. AVs according to the invention may further identify a refueling device, automatically position relative thereto, couple to the refueling or charging fixture, detach and move off to the next destination point.

Other supported AV operations may include at least the following:

Military applications including identification and positioning to an ammunition, equipment or personnel reloading point, positioning, uploads (or downloads), and move off to a next destination point;

Entering, proceeding through, and exiting a washing station;

Execution of utility functions as an AV proceeds through its mission plan, cued by roadway locations;

Execution of behaviors cued by (a) passing by a point in the route plan that identifies beginning or ending of the utility function or behavior; (b) reception of a V2I message that identifies beginning or ending of the utility function or behavior; or (c) detection and decoding of a visual sign that identifies beginning or ending of the utility function or behavior, including, without limitation:

i. Traffic controls and driving behaviors including speed limit keeping, yielding, merging, stopping at intersections and proceeding through them, entering and leaving traffic circles, passing allowed/disallowed, turning left or right, traveling (at reduced speeds) through construction zones, and u-turns, and ii. Other functions concurrent with driving a route including mapping, scanning for targets, (for military vehicles) firing on targets, performing street maintenance or inspection (painting lines, sweeping, snow plowing, dirt road grading, road surface oiling or paving, or complex payload behaviors;

Utility functions or behaviors including proceeding through an intersection, inhibiting lane changes before the intersection for the vehicle stopping distance at the road speed limit;

Utility functions or behaviors including proceeding through an actively controlled intersection with a V2I intersection controller that includes:

i. Sensors to detect vehicles at the entrance or within to the intersection and communicate this information to vehicles at and inside of the intersection, ii. Controls that manage lights sequencing from green to yellow to red and associated other directions (lighted signs, lighted director arrows, flashing red, flashing yellow, or other light functions), iii. Controls and communications to vehicles at the intersection that disallow entry of vehicles into the intersection when one or more vehicles are detected in the intersection, whether they were signal to proceed by the intersection controller or entered the intersection violating the entry protocol, and iv. Controls and communications allowing specific vehicles at intersection entries to proceed into the intersection and proceed out one of a limited number of intersection exits;

Utility functions or behaviors including proceeding through an passively controlled intersection between a higher priority roadway and a lower priority roadway, wherein:

i. Sensors in each vehicle at the entrance or within to the intersection that detect other vehicles at or entering the intersection and communicate this information to other vehicles at and inside of the intersection, ii. Controls and communications from each vehicle to other vehicles at the intersection that disallow entry of vehicles into the intersection when one or more vehicles are detected in the intersection, whether they were signal to proceed by the intersection controller or entered the intersection violating the entry protocol, iii. Controls and communications allowing specific vehicles at intersection entries to proceed into the intersection and proceed out one of a limited number of intersection exits according to rules of the road, such as:

The vehicle passing through the intersection on the higher priority roadway proceeds first, A vehicle turning left from the high priority roadway messages a request to enter across a high priority opposing traffic lane and proceeds after the lane being crossed is clear for at least the speed limit stopping distance plus the time it takes to accelerate through the lane or it gets a proceed reply from on-coming traffic, A vehicle entering from the lower priority lane messages a request to enter the high priority lane right and proceeds when the right lane is clear for at least the speed limit stopping distance plus the time it takes to accelerate through the lane or it gets a proceed reply from on-coming traffic, and A vehicle entering from the lower priority lane messages a request to enter the high priority lanes right and left and proceeds left or passes through to the opposite intersection exit when the right lane and the left lane are clear for at least the speed limit stopping distance plus the time it takes to accelerate through the lane or it gets a proceed reply from cross traffic right and left;

Utility functions or behaviors including proceeding through a passively controlled intersection between equal priority roadways (or an n-way stop), using one or more of the followings rules:

i. The first vehicle to the intersection entry proceeds first;

ii. If other vehicles are waiting to proceed, the one to right of the vehicle that just passed through the intersection proceeds next;

iii. If all vehicles are stopped at the intersection at the same time, each waits a random time period and the vehicle that computes the shortest time interval goes first, and then the one to its right proceeds, and so forth;

iv. If the intersection is an n-way stop each vehicle must stop before entering the intersection; and v. Each vehicle at the intersection messages time when it is at the intersection entry to the other vehicles present so a common time base is established.

Merging onto a limited access roadway, which may include:

i. Message requesting merge, and ii. Reply message acknowledging merge space available or verification of space available by in-vehicle sensors;

Changing into an adjacent lane on a multiple lane roadway, which may include:

i. Message requesting lane change, and ii. Reply message acknowledging lane space available or verification of space available by in-vehicle sensors;

Passing across the center line on a two way roadway for passing or left turn, which may include:

i. Message requesting lane crossing, and ii. Reply message acknowledging on-coming traffic gap available or verification of space available by in-vehicle sensors;

Communications with a pedestrian wearing a location tracking device;

Communications with obstacle objects like pedestrians and other vehicles to detect and predict the location of other obstacles by V2V and V2P messages redundantly with:

i. Obstacle detection sensors (LADAR, RADAR, Computer vision-based object detection systems) to:

ii. Populate the world 3D map used to determine local paths that (a) avoid obstacle, (b) stop before hitting the obstacles, and (3) slow down to pace moving obstacles being followed;

Using polynomial path extrapolation to accurately project paths that are generated by Ackerman steered vehicles, assuming that linear extrapolation is insufficient;

Performing steering control based on inertial measurements and vehicle speed measurements using data that is most accurate over a short time frame, while correcting for these measures by over-watch sensors such as GPS or tracking based on measurements from the travel path proximal area (ranges measured to surrounding landmarks or relatively permanent features of the environment, lane markers or lines on the roadway, road shoulders, or other localized beacons or signs, and features); and Evaluating potential collisions and/or collision avoidance behaviors by limiting the obstacle search to the approximate lane width along its intended path of travel or for moving objects that are travelling along paths that project through its line of travel in the presence of objects are not dangerous and should be effectively ignored. The alternative of basing safety stop computations on a simple projection zone in front of the vehicle along a simple line will cause the AV to stop unexpectedly.

DETAILED DESCRIPTION OF THE PREFERRED EMBODIMENTS

Figure 1:
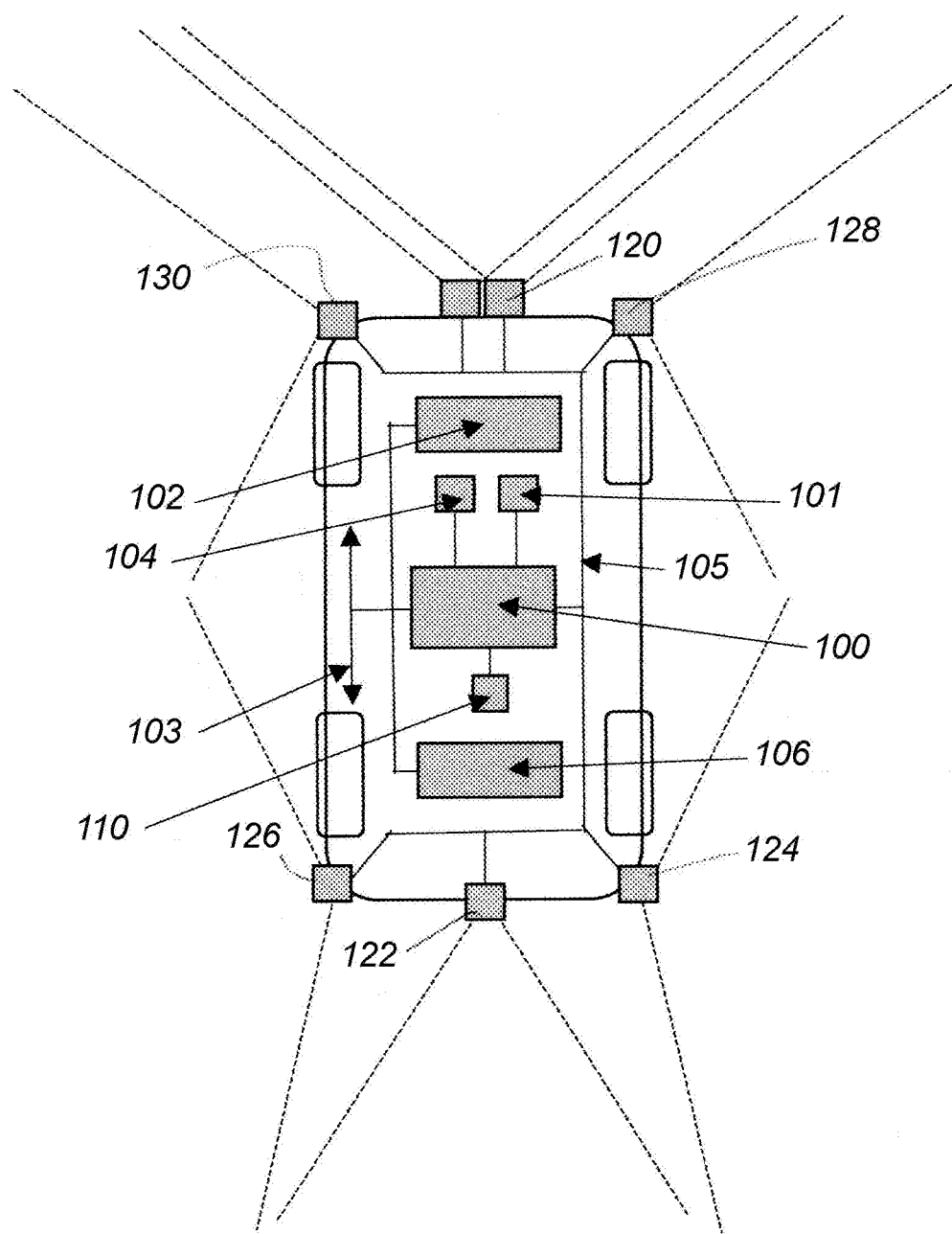
FIG. 1 is a block diagram that shows an autonomous vehicle (AV) incorporating systems and subsystems that have been disclosed in the literature.

In parallel with the development of technology enabling AVs is the idea of incorporating Vehicle-to-Vehicle (V2V), Vehicle-to-Infrastructure (V2I) and Vehicle-to-Pedestrian (V2P) transceivers. As envisioned by the United States Department of Transportation (DOT) Intelligent Transportation Systems Joint Program Office, short-range communications supporting high speed data exchange between vehicles can be the basis of vehicle safety applications, including alerts to vehicles of imminent hazards and information such as:

veering close to the edge of the road vehicles suddenly stopped ahead
collision paths during merging
the presence of nearby communications devices and vehicles
sharp curves or slippery patches of roadway ahead.[1]
Further identified applications include:
Blind spot warnings
Forward collision warnings
Sudden braking ahead warnings
Do not pass warnings
Intersection collision avoidance and movement assistance
Approaching emergency vehicle warning
Vehicle safety inspection
Transit or emergency vehicle signal priority
Electronic parking and toll payments
Approaching construction
Detours
Narrow lanes
Shifting lanes
Commercial vehicle clearance and safety inspections
In-vehicle signing

[1] DOT, Office of the Assistant Secretary for Research and Development, Intelligent Transportation Systems Joint Program Office, DSRC: The Future of Safer Driving, https://www.its.dot.gov/factsheets/dsrc_factsheet.htm Rollover warning
Traffic and travel condition data to improve traveler information and maintenance services U.S. Pat. No. 9,952,054 [An, et al.], and disclosure 20180012492 [Baldwin; Craig A., et al.] describe similar systems to implement this kind of communication between vehicles and infrastructure, but do not explain how this infrastructure is related to a complete realizable system for nearly 100% safe operation of autonomous vehicles (AVs) or autonomous driving systems (ADS).

While both basic AV technology and V2x infrastructures contribute to better safe future vehicles and roadways, the goal of true safety will not be successfully achieved by more artificial intelligence or other technologies without a comprehensive, standardized AV vehicle and roadway infrastructure architecture. Recent testing of AVs, while showing promise, indicates there appears to be a limit to the safety and fully automatic Level 4 or 5 automation as defined by the SAE.[2] Brandsom [July 2018][3] provides a strong argument that on its present course, AI technology is not likely to achieve safe level 4/5 autonomy. A recent analysis of disengagement statistics provided to California by Piekniewski [Sep. 2, 2018][4] suggests that present autonomous vehicle AI may be reaching a plateau, requiring a change in strategy to make completely safe AVs. Roadway system wide application of V2x technology still awaits standardization and probably mandates from the DOT.

[2] SAE, "Taxonomy and Definitions for Terms Related to Driving Automation Systems for On-Road Motor Vehicles", J3016_201609, Sep. 30, 2018, https://www.sae.org/standards/content/j3016_201609/
[3] Brandom, Russell, "Self-driving cars are headed toward an AI roadblock," The Verge, Jul. 3, 2018, https://www.theverge.com/2018/7/3/17530232/self-driving-ai-winter-full-autonomy-waymo-tesla-uber.
[4] Piekniewski, "Autonomous vehicle safety myths and facts, 2018 update," https://blog.piekniewski.info/2018/02/09/a-v-safety-2018-update/.

To address these issues, we define a system (FIG. 2) that combines V2V, V2I, and V2P communication that integrates with, and augments, in-vehicle autonomous vehicle sensors, perception, and behaviors to provide the following:

(a) Vehicles with at least doubly redundant capabilities for detecting active traffic flow infrastructure (traffic lights, speed limits, constructions zones, etc.);
(b) Vehicle with full knowledge of moving elements (other vehicles and pedestrians) in the proximal driving area, including future motion intentions out at least to the stopping distance;
(c) Vehicles that are actively managed through actively controlled traffic intersections (stop light intersections), eliminating error-prone computer vision-based detection of traffic lights and light state; and
(d) Vehicles that implement a common request/reply policy for uncontrolled intersections and lane changes so that the traffic can flow smoothly and fairly, allowing higher priority to priority lanes, while providing holes in the traffic for vehicle turning in from low priority streets into higher priority ones, for lane changes, and ramps associated with highway merging.

The core to this implementation is a common set of shared vehicle control behaviors which implement safe driving identically on every vehicle (autonomous or manually driven), adding safety interfaces, limits and controls to manual vehicles so that the manual driver adheres to basic driving safety rules and regulations as rigorously as do the autonomously control vehicles, removes unreliable decoding of traffic controls, and provides for common standards of autonomy testing, sharing of vehicle behaviors that may evolve as the technology evolves, and common roadway regulation to achieve, ideally, 0% accidents.

Figure 2:
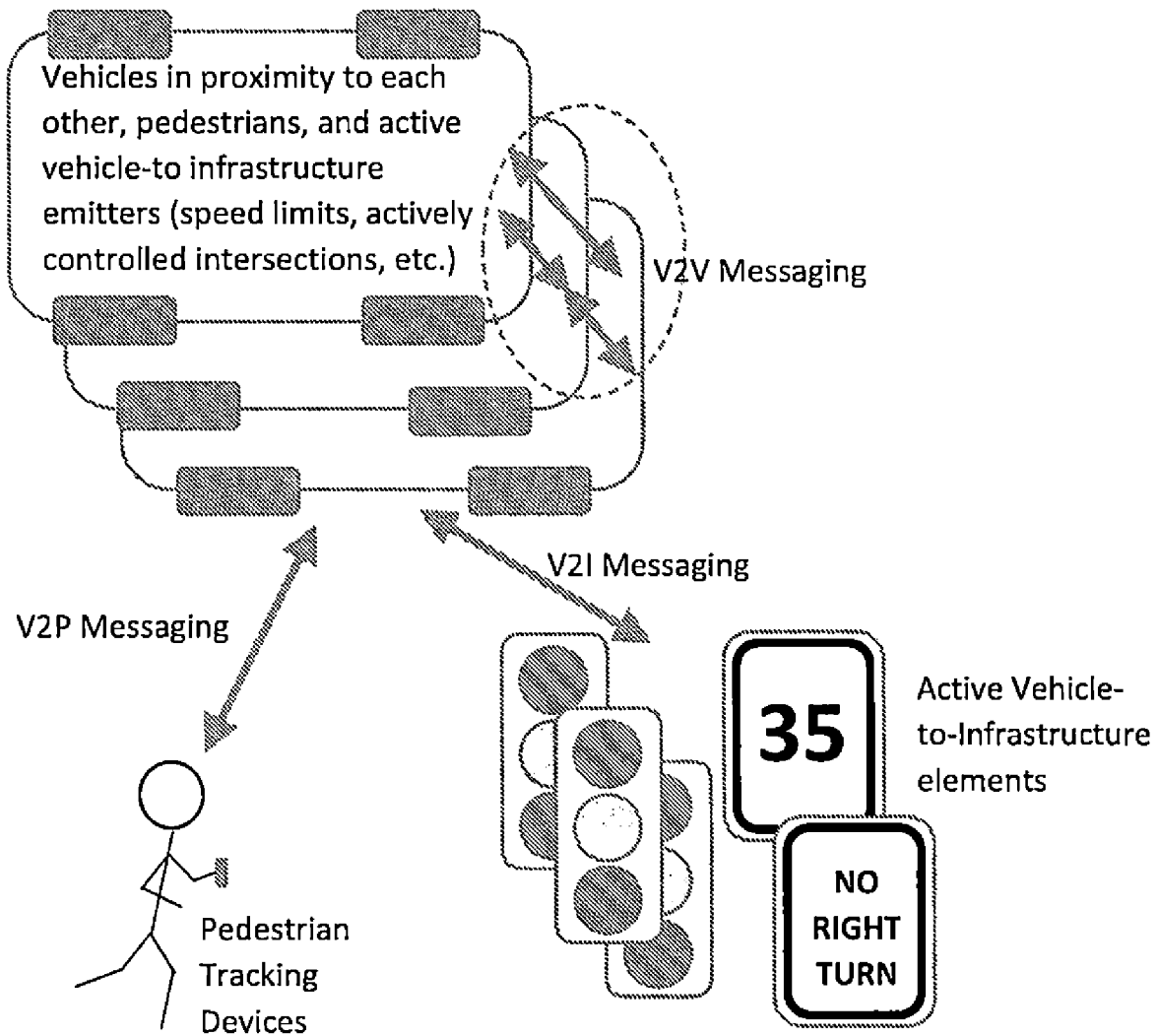
FIG. 2 illustrates a system according to the invention that combines V2V, V2I, and V2P communication that integrates with, and augments, in-vehicle autonomous vehicle sensors, perception, and behaviors.

Beginning with an autonomously driven vehicle (AV) or safe-manually driven (advanced driver assistive systems or ADAS) vehicle, we disclose a system that includes the components shown in FIG. 2. The core vehicle function is the AV itself, as shown in FIG. 1 but with—at a minimum: electronic controls for starting and stopping (engine or other power source), speed control (throttle or electronic control of speed, and transmission control), and steering. To this we add maximum stopping or braking that is used when imminent collision is detected. Compared to normal braking—a controlled deceleration rate for passenger comfort and planned stopping distance, maximum braking is the fastest stopping distance possible associated with full vehicle braking action for emergency stopping, and maximum acceleration to avoid moving obstacles (such as oncoming speeding vehicles).

Figure 3:
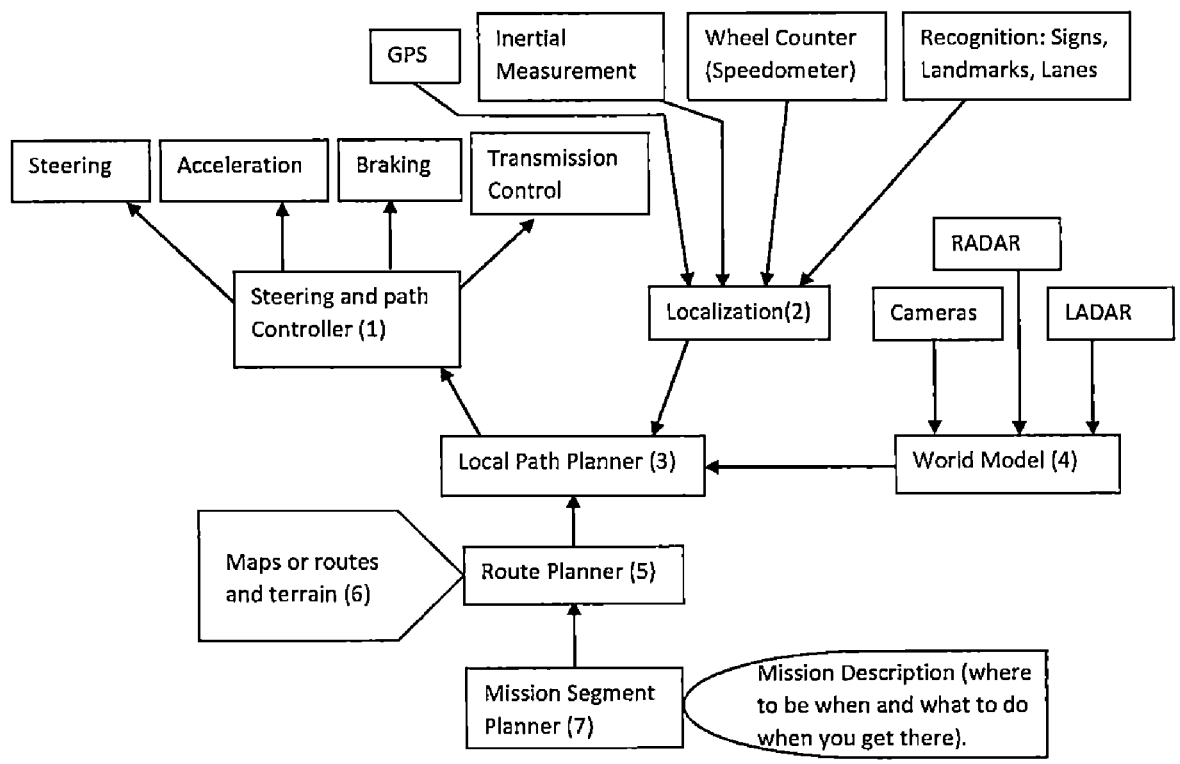
FIG. 3 depicts a software stack of autonomous modules, including a path control module that keeps the vehicle at a commanded speed, direction of travel, and on a planned path, minimizing the difference between vehicle localization and the commanded path.

Over these basic vehicle controls is a software stack of autonomous modules (FIG. 3). These applications may include a path control module (1) that keeps the vehicle at a commanded speed, direction of travel, and approximately on the planned path minimizing the difference between vehicle localization (2) and the commanded path. This module also will typically perform planned slowing, stopping, or maneuver within an allowed lateral deviation from the planned path due to the detection of obstacles (other vehicles, pedestrians, or road obstacles large enough to interfere with smooth driving).

Over the path control module (1) is a local path planner (3) that keeps the vehicle on its planned path, while at the same time, dynamically modifies the local path to avoid obstacles identified in the 3D work model. The world model (4) is populated by the suite of obstacle and terrain sensors, RADAR, LADAR/LIDAR, and/or computer vision processed focal plane sensors). Over the path executor (or local planner) is a route planner (5) that provides a connected set of path segments extracted from a map database (6) or graph that will take the vehicle from its pick-up or starting point to a specified destination. Over the route planner is a mission segment planner (7) that defines destination and intermediate destination points in order of visit and can also in some application, link to artificial intelligences that execute some form of work at some or all of the destination points. Refinements include detection of road speed limits, determining if a slow vehicle can be passed or must be paced (and whether passing is allowed or not), detection of space to enter a lane or turn into a circle or cross street based on detection of the positions of cross traffic or other obstacles like pedestrians, and the state of active traffic controls (stop lights or lighted traffic flow signs) or yield rules.

For many AVs, there is a utility function to be performed optionally at each starting or stopping point in addition to moving from the starting point to the specified destination point. For a work vehicle[5] this might include accepting a load/unload location, acquiring and stowing a load, and/or unloading. Loads can be partial, or loads that completely fill the storage capacity of a vehicle. For a taxi it will include stopping for passenger pick-up, accepting the passenger's method or payment, and accepting the passenger's destination information. For a commercial truck it might include coupling to a trailer, accepting a destination, and dropping the trailer at the destination. For a package delivery or garbage pick-up system, substitute package/or other payload for person and perform similar pick-up and drop-off utility functions. For a consumer vehicle it might include scanning a parking street side or area or entering a parking structure or garage, identifying a space, and performing a parking operation. For a vehicle that is trailer capable, it might entail lining up with a trailer and effecting trailer coupling and towing, or alternatively trailer back-up to a drop point and detaching from the trailer. An AV might identify a refueling or charging device, position to it or over it, couple to the refueling or charging fixture, detach from the fixture, and move off to the next destination point. For a military AV, a similar loading operation for ammunition resupply might be a utility function. An AV might enter, proceed through, and exit a washing station or any other close, specialty movement operation that requires non-standard behaviors.

[5] In an autonomous material handling system as disclosed in U.S. Pat. No. 8,965,561, Jacobus et al. destinations are associated with actions to inspect, pick-up, or place pallets or containers of goods.

Figure 4:
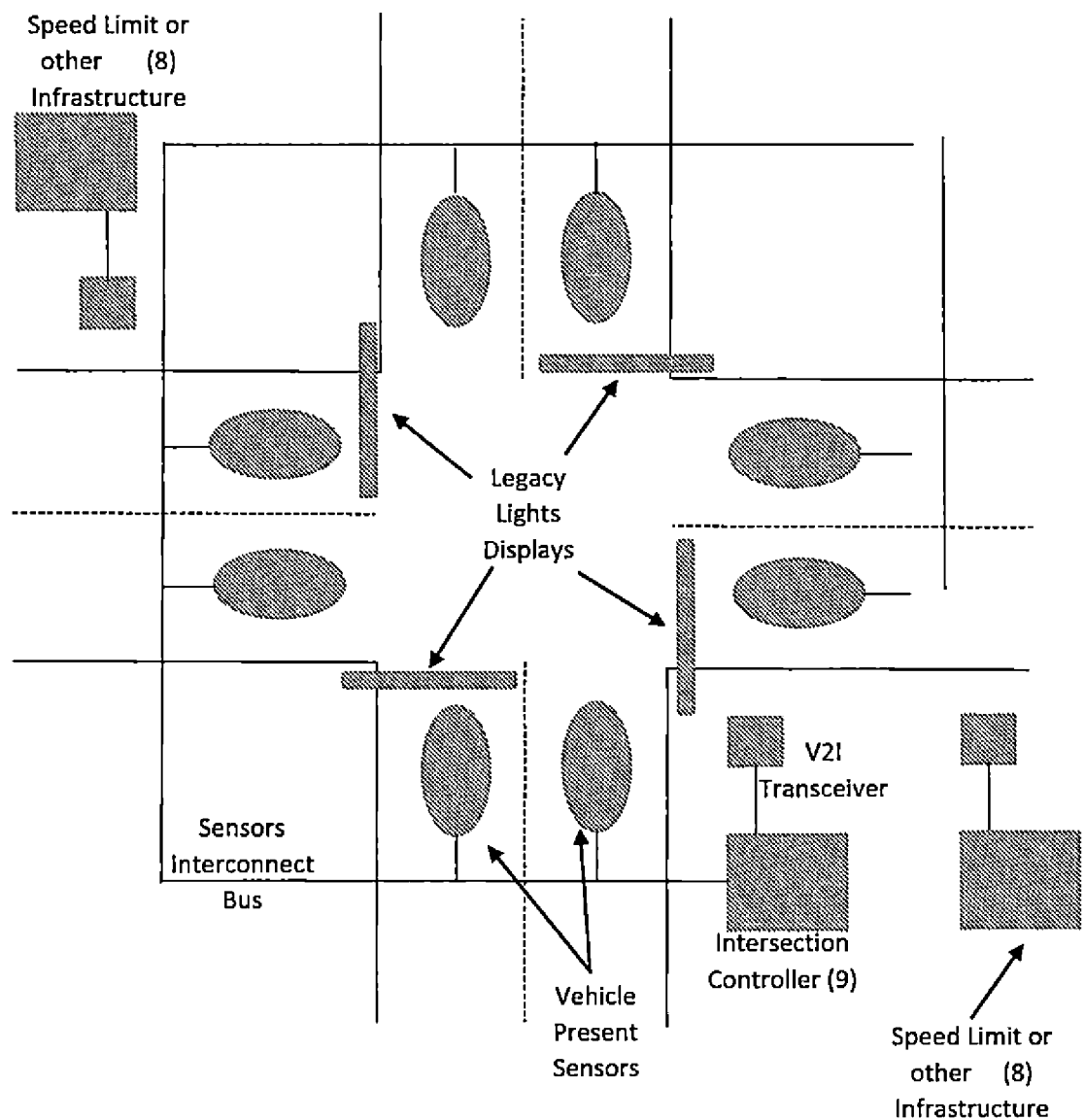
FIG. 4 shows behaviors TYPE, BEGIN, and END specified by a V2I message emitted by road side element.

The most complex aspects of behavior involve what the AV does as it is driving though its planned routes from start points to destinations. These behaviors include specific driving behaviors such as speed limit keeping, yielding, merging, stopping at intersections and proceeding through them, entering and leaving traffic circles, passing allowed/disallowed, turning left or right, traveling (at reduced speeds) through construction zones, and u-turns. However, it can also include complex payload behaviors such as mapping, scanning for targets, (for military vehicles) firing on targets, performing street maintenance or inspection (painting lines, sweeping, snow plowing, dirt road grading, road surface oiling or paving, etc.). These behaviors may be triggered in following ways:

(1) Behavior TYPE, BEGIN, and END are specified as a property of roadway segments defined in the AVs mission plan starting at some waypoint and ending a some waypoint, typically either specified in the mission plan or in properties of waypoints defined in the map database;

(2) Behavior TYPE, BEGIN, and END are specified by a V2I message emitted by a road side elements like that shown in FIG. 4. These may emit standard format RF messages, flagging speed limit changes, construction site barriers and markers, yield rules, intersection controls, etc. For items like intersections that are not static, and cannot be reliably detected visually, these V2I messages are necessary for 100% safe control of traffic flow through shared spaces (like intersections);

(3) Behavior TYPE, BEGIN, and END are determined by the AV local perception system, such as presence/absence of other vehicles at the entry points to intersections, visual road signs (for speed limits, yields, passing allowed/disallowed, right or left turn prohibitions, etc.), and street signs (marking entries, exits, and naming or numbering roadway segments. These conditions are always detected with a probability of correct detection (typically in the 70%-95% range), and therefore wherever this information is critical for safe vehicle operation, visual signs have to augmented by devices that emitted the correct V2I messages redundantly (i.e. case (2) above), or in AV carried or downloaded digital maps (i.e. case (1) above).

Perhaps the most complex in-route behavior requiring V2V or vehicle to traffic control infrastructure collaboration is the actively controlled intersection shown in FIG. 4. Based on the messages defined later herein, there may be many subsets of the core V2I transmitter shown in FIG. 4. For instance, a device to transmit speed limits or lane change limitations might simply be a short-range signal transmitted without any sensing capabilities (8). However, at an actively controlled intersection controller (9) will have sensors to detect vehicles, controls to manage stop lights & signage, and its supporting V2I messaging will be more complex, for instance defining the priority for entering and leaving the intersection that includes (a) yielding to any vehicle violating the specified protocol, (b) proceeding when the traffic control allows it, and (c) proceeding from an intersection entry lane to only one of the exit lanes allowed (i.e. turn/no-turn specifications, right turn on red if it does not interfere with cross traffic, if this is not disallowed, turning per specific active arrows or signs).

In this disclosure, we place the responsibility for managing the in-flow and out-flow of vehicles with an updated wireless traffic control element that converts STOP, YIELD, TURN and GO commands presently encoded as physical lights (red, yellow, green, various illuminated turn arrows, and written information like "No Turn on Red," etc.) into electronic commands communicated to all vehicles entering or waiting at the intersection through V2I communications messages. Even manual vehicles will come to be equipped with on dashboard indicators that are complete enough to replace present day intersection traffic control lights (although during an extended phase in period, present day stop/go lights in intersections will be retained for legacy vehicle traffic at the expense of the potential for cross traffic accident events).

For uncontrolled intersections there is preferably a common protocol wherein vehicles on higher priority roadways take precedence over those entering from lower priority roadways. To cross or enter a high priority lane, a gap in traffic must be detected that is at least the stopping distance of vehicles travelling at the speed limit plus the time required to accelerate from stop into or through the higher priority lane crossed or turned into. As indicated below with regard to V2V message sets, a the lower priority vehicle requests to enter to higher priority roadway and receive an acknowledgement replay from on-coming or up-coming traffic before proceeding. For an intersection between roadways of equal priority, the first vehicle to the intersection goes first, unless multiple vehicles arrive simultaneously—then the one to the right goes first.

However, in practice, human drivers often replace this protocol with one that could be stated as the most aggressive goes first and the rest accommodate. Similarly, in merging into a lane (or into a circle), the car entering is supposed to wait until a large enough space in cross traffic allow safe entry. In practice again, however, in heavy traffic the cross traffic must make space to allow entry or the entering driver must aggressively force his vehicle into the cross traffic flow, or entry may not be possible in a timely manner. This is especially important on fast moving expressways where the incoming vehicle must speed up to match cross traffic flow, but then may not have a safe landing on the road shoulder if a space for safe entry is denied by the cross traffic. This invention is designed to accommodate these and other real-world situations.

Figure 5:
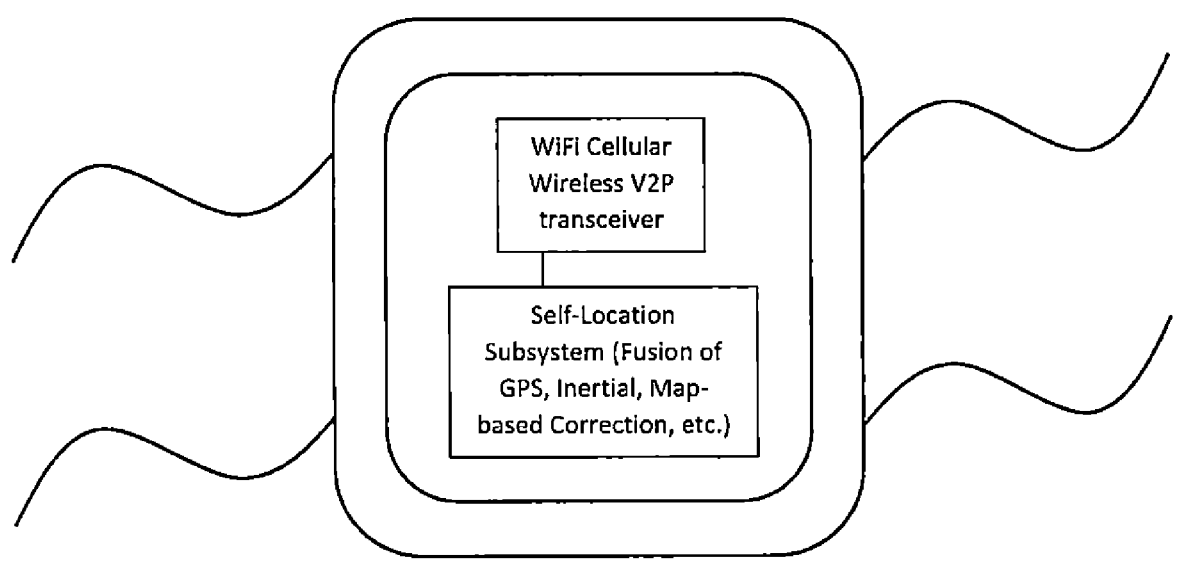
FIG. 5 illustrates how V2P and V2P communications provide an alternative way to detect collision/accident threats.

Beyond difficult interception behaviors, V2P and V2P communications (FIG. 5) provide an alternative way to detect collision/accident threats to (a) provide redundancy to commonly employed obstacle/collision detection sensors like RADAR,LADAR/LIDAR, and computer vision based terrain and obstacle location, range, and closing velocity estimation; and (b) enable pedestrians to be part of the architecture so as to substantially reduce the likelihood of traffic fatalities due to pedestrians entering a roadway from invisible or occluded locations, such as between parked cars, blind corners, or foliage blocking visibility.

A 'smart' watch-like device (i.e., a carried smartphone, a smart pendant that is worn, or and exercise bracelet) can integrate into the radio network (typically through cellular phone wireless) and can present the location of the person wearing or carrying the device, thus providing nearby vehicles location information that they would otherwise only be able to derive from obstacle detection range data. The obstacle data for any of the presently available sensors is strictly line-of-sight so many situations are present where the autonomous vehicle cannot detect potential collisions until after the victim is inside of the autonomous vehicle's stopping distance—an accident avoidance situation that is almost impossible to mitigate. Furthermore, obstacles are typically detected only along the path an AV "intends" to drive, so on-coming object only become obstacles if their path of travel intersects with the AV's planned path. Because the on-coming obstacle may "intend" to change path toward collision, without that being directly measurable or extrapolated from obstacle track information, messages from vehicle to vehicle projecting their intended paths out to the stopping distance eliminates the possibility of this confusion.

Any competent AV requires redundant sensors to detect obstacles, specifically vehicles, and objects that might enter the vehicle's drive path as cross traffic (other vehicles and pedestrians). These might be RADARs looking in all potential travel directions, or alternatively LADAR or computer vision-based object detection systems (also in every direct of potential travel), but then also include V2V and V2P communications means to collect data about current state and near future one to several seconds of planned or predicted travel path and speed of any vehicle or pedestrian in the near distance, i.e. within a one to several second radius at current vehicle-to vehicle or vehicle-to-pedestrian closing velocity).

For predictable roadway behaviors and ultimately roadway safety, all vehicles, including manually driven ones, have to obey a core set of common driving rules which we summarize in the following set of rules and procedures. These rules should be fully disseminated through a common documentation process which mirrors the RFCs that compose common Internet Protocol,[6] and openly archived and distributed to any manufacturer of equipment or vehicles that are to be allowed inside of any roadway system that is designated as autonomous capable. As the AV rules are refined, corrected, and extended, the new changes also need to be openly archived and distributed to any manufacturer of equipment or vehicles so the entire system can stay correlated. The issue will be whether these rules can be privately maintained (ex: like the Internet Engineering Task Force), maintained by a worldwide standards body, or by individual national or state governments. That will be determined by convention, legislation or other political action which is beyond this disclosure.

[6] RFC: Request For Comment—maintained for the Internet by Internet Engineering Task Force, https://www.rfc-editor.org/retrieve/

The following summarizes the implementation of an AV architecture through rules, data achieving, and necessary error correction:

Localization

The core subsystem to support managed autonomy is maintaining accurate knowledge in each active vehicle of where it is (and its dimensions) in the managed transportation area (roadway, parking area, etc.). How accurately position information can be maintained defines how close to each other vehicles and other roadway objects can be allowed to operate. For instance, if we could maintain a 2 cm localization accuracy, at low speeds it is possible to come within that distance and a safety factor (may be two times) to adjacent objects without collision risk. Practical minimum accuracy for roadway vehicles is about one tire width or about 8" (~200 mm). Most precision GPS localizers can meet or better this requirement with 6 satellite fixes. Inertial measurements exceed this accuracy until random-walk errors build up. This suggests that for outdoor localization, employing precision GPS to bound localization error (i.e. to bound random walk errors from the internal sensors), combined with inertial updates to provide faster smoother updated interpolations, is an ideal localization solution.

In addition, it must be possible to extrapolate future path of vehicles (for example, 1-6 seconds out) based on planned path, speeds, and steering angles. For simple path projection from a list of prior location points, a second order polynomial of the following form works well because it captures the fact that over a short time interval when the steering angle is effectively fixed, location track points will exactly fit this order of curve though out a straight and turning path segment (some people have used linear extrapolators which will provide accurate projections over very short time intervals or straight paths, but do not support longer projections through curves or steering operations).

One second-order overwatch extrapolator constructs two $2^{nd}$ order polynomials for the most recent AV location measurements (fused or from an overwatch sensor like GPS or point cloud localization). One polynomial for X and one for Y, with time being the independent variable:

$$P_x(t)=Ax*t*t+Bx*t+Cx \qquad \text{Eq. 1:}$$

$$P_y(t)=Ay*t*t+By*t+Cy \qquad \text{Eq.2:}$$

The coefficients are calculated using linear least squares regression from a prior list (prior n localizations, perhaps 1-6 seconds worth of data). The derivatives, Vx(t) and Vy(t), are calculated for the midpoint of the temporal envelope for X and for Y by:

$$V_x(t)=2*Ax*t+Bx \qquad \text{Eq. 3:}$$

$$V_y(t)=2*Ay*t+By \qquad \text{Eq. 4:}$$

Heading, α, is calculated as α=a tan 2(Vy, Vx), and compared against the estimate of heading at that time ($\alpha$_estimate). The difference between the $\alpha$ and $\alpha$_estimate is then applied to smooth the current estimate from inertial measurement.

Maneuver to Move from a Starting Point to Destination Points:

The core function of an AV is to transport payloads and/or people from a starting point to a destination point. This is accomplished by locating the starting point on or near a digital roadway map. Then search is performed to identify an acceptable path from this starting point to the destination, also located on the map, that minimizes cost metrics including minimum distance, time, safety, fuel use, fewest congestion segments (segments where traffic congestion is reported), and maximum utilization of priority segments (segments with larger traffic flow and higher speed limits). Typically the path search utilizes an A* type search[7] algorithm which generates best paths limited by a heuristic search computation limitation.

[7] Zeng, W.; Church, R. L. (2009). "Finding shortest paths on real road networks: the case for A*". International Journal of Geographical Information Science. 23 (4): 531-543. doi:10.1080/13658810801949850

However, maps serve another important function in an all weather/conditions capable AV. While there are demonstrated lane keeping sensors, these are typically only good enough for well manicured highways (where lane markers are very well maintained and visible to sensors) during good weather conditions (no snow, dirt, rain, etc. obscuring the lane markers). Therefore, an all-weather AV must employ other lane tracking techniques to augment lane detection through sensors. The proven method is to use a combination of the precision tracks encoded into the digital map and the vehicle localization system.

The localization system described above provides vehicle location to within better than a tire width. If the digital tracks in the map are also better than that, lane keeping can be accomplished through a steering servo designed to keep the vehicle on the planned track within the localization sensor error.[8] Speed limits and static traffic controls (yield, speed limits, lane closures, stops, right left turn limitations at intersections, etc.) can also be encoded into the map. The core of these features was demonstrated in 2007 at the DARPA Urban Challenge,[9] where roadmaps were encoded as RNDF graphs (Route Network Definition Files).[10] From starting points to destination points were encoded as MDF files (Mission Definition Files)[11] that specified starts, intermediate destinations, and final destination over an RNDF road network. While these files define road graphs, these can be coded in a computer in many ways, including as relational databases, directed graphs, semantic nets, array lists, lists, associative memories, etc. The encoding simply affects how the data is searched to find paths.

[8] Snider, Jarrod M. "Automatic steering methods for autonomous automobile path tracking." Robotics Institute, Pittsburgh, Pa., Tech. Rep. CMU-RITR-09-08 (2009).
[9] DARPA, Urban Challenge, https://www.grandchallenge.org/grandchallenge/
[10] DARPA, Route Network Definition File (RNDF) and Mission Data File (MDF) Format, Mar. 14, 2007, https://www.grandchallenge.org/grandchallenge/docs/RNDF_MDF_Formats_031407.pdf.
[11] DARPA, Route Network Definition File (RNDF) and Mission Data File (MDF) Format, Mar. 14, 2007, https://www.grandchallenge.org/grandchallenge/docs/RNDF_MDF_Formats_031407.pdf.

Path planning derived from the graph network is a 2-stage process. The first stage uses a spatially constrained A* process on a grid constructed from known map data plus currently known obstacles. This provides a course path from the vehicle start position to a target destination. The second stage uses a 3-degree of freedom (x, y, heading) Rapidly-exploring Random Tree (RRT) algorithm[12] constrained by stepping along the A-star path. Each "edge"/step of the RRT is a turn, followed by a straight drive, followed by a turn. The RRT explores the space for a configurable time and returns the best solution for each step that precludes paths that exceed the turning radius of the vehicle. Some form of constraints to accommodate vehicle turning, braking, and acceleration limitations are required so that proposed paths derived from the map data are executable by the target vehicle.

[10] LaValle, Steven M.; Kuffner Jr., James J. (2001). "Randomized Kinodynamic Planning" (PDF). The International Journal of Robotics Research (IJRR). 20 (5): 378-400. doi:10.1177/02783540122067453.

Implementation of V2V, V2I, and V2P Radio Messaging:
1. Standardized V2V and V2I Radio Frequency parameters, data grams, and content. Message grams encode the following:
   a. Plan "where entity is" (GPS coordinates—about 6 seconds of plan data depending on travel speed)
   b. Plan direction and rate of speed (6 seconds of plan data depending on travel speed)
   c. Actual where, direction, turn rate, and speed
   d. Status—vehicles, functional status (good, degraded, failed) (occupied/not occupied) (manual drive/automated drive, supervised/unsupervised automated drive)
   e. Status—infrastructure—lane blockage, prescribed mitigation: merge left or merge right
   f. Status—lane changes/passing allowed right, allowed left
   g. Status—infrastructure—Intersection
      i. Encode incoming and outgoing for each lane
      ii. Encode lane properties straight only lane, straight or turn right lane, straight or turn left lane, right only lane, left only lane
      iii. Encode this lane yields to cross traffic, cross traffic yields to this lane
      iv. Encode lane active regulation, red (stop), yellow (pending red stop), green (go)
   h. Status—infrastructure—speed limits (min max)
2. Messages for client server navigation and status reporting
   a. Messages to down load map segments for route planning to vehicles
   b. Messages to down load routes if server performed route planning for the vehicle
   c. Messages for municipalities or other Government to upload changes in the roadway (new roads, closed roads, work areas, etc.)
   d. Messages for work crews to to upload changes in the roadway due to road maintenances or construction
   e. Messages for vehicles and vehicle operators to upload status changes including maximum, minimum, and average drive speeds, debris on the road, adverse driving conditions reports, locations in need of roadway repair, road blockages, etc.
   f. Messages from server to clients to effect dynamic traffic flow—includes reprogramming or intersection light priorities, speed limits lowered or raised due to road conditions, messages that suggest route replanning due changes in traffic flow or road conditions.
   g. Messages for support of differential GPS (including indicating that Differential GPS corrections are unavailable).

Defining AV Standard Cooperative Driving Methods, Behaviors:
3. Standardize lane keeping, merging and intersection driving behaviors:

a. No passing within x distance to intersection (x set based on stopping distance at roadway travel speed).
b. No lane change or merging, if lead vehicle is less than y distance ahead at x travel speed (x set by lead vehicle merging vehicle speeds—a 70 MPH x should be about 7 car lengths of approximately or 4-4.5 meters*7, approximately 28 meters) and traveling faster or equal to the merging vehicle
c. No lane change or lane merging, if side or trailing vehicle less than y distance (y also set as MPH/10 car lengths as in b above) behind and travelling equal to or slower than the merging vehicle speed; note message requesting merge, and response from the trailing vehicle should occur before the change or merging so that in dense traffic this condition can be created for the in-merging vehicle.
d. No entering of an unmanaged intersection unless cross traffic vehicle less that y distance away (y set approximately as cross traffic MPH/10*car lengths*2 to account for acceleration rate from near 0 MPH).
e. Enter un-managed intersection according to right of way rules. First to intersection goes first. If two or more at the same time (or cued) right most has right of way—goes first
f. If above rules don't apply (i.e. no vehicle can determine that it has entered first and vehicles are waiting for a turn to enter the intersection), execute a randomized wait time then go if no other vehicle has entered the intersection within the wait time.
g. In intersection, conflict generates stop until resolved (i.e. stop if anyone is in the intersection already, wait for them the clear through)
h. Maintain safe head distance of y distance at x speed for safe stopping (this is actually a table relating stopping distance to travel speed)

Defining Methods for Integrating Both Manual Driven Vehicles into the Same Roadway as AVs:

4. Autonomy and Manual vehicle integration
   a. Whenever driving unsupervised (or supervised by a driver with hands off the wheel) provide a standardized visual signal visible to other drivers that shows operation in an automated mode (Flashing yellow light?)
   b. Standardize the means for supervising driver to take control from an automated driver (tap brakes, grab wheel, etc.)
   c. Per Safety 2.0: An Autonomous Driving System (ADS) must provide a standardized means for informing the human operator or occupant through various indicators that the ADS is: Functioning properly, currently engaged in ADS mode (on or off), currently "unavailable" for use, experiencing a malfunction; and/or requesting control transition from the ADS to the operator.
   d. Standardize automated driver signaling to the supervising driver that control should be assumed due to safety or failure mode conditions
   e. If faults are not attended to by the supervising driver, use a standard visual signaling means to indicate automated failure mitigation procedure is in effect. Best mitigation: Move right to shoulder and slow to stop if systems generate or detect faults unless positive control is assured from supervisory driver. Next best mitigation: If moving to the shoulder is not safely possible slow to stop if systems generate or detect faults unless positive control is assured from supervisory driver.
   f. Apply turn signals, brake lights, and headlights in the standard way to respectively indicate turns and lane changes in advance of the action, braking effort when applied, and at dusk (unless always on)
   g. Define a standard dash display to indicate stop/go (red, yellow, green) status at managed intersections displayed to each drive applicable to his/her lane and incorporated into both manually and automated vehicles from some date forward. This is an in-vehicle rendition of the data which presently would be displayed by stop light assemblies, but without the subjectivity of what traffic control applies to which vehicle at the intersection.
   h. Define a standard for automated and manual vehicles to maintain posted speed limit maximums from some date forward. Can be by encoded digital map or by RF active speed limit postings but also likely to be updated immediately through V2I messaging.
   i. Define a standard for assuring adequate safe stopping head room for automated and manual vehicles to maintain posted speed limit maximums from some date forward. This is an internal speed limited based on forward vehicle detection and travel speed/conditions.
   j. Define a standard for a device that can be carried by non-vehicles (perhaps from a pedestrian carried cellular phone, etc.) that provides P2V data comparable to x above for non-vehicle (pedestrian) so that all vehicles, automated or manual can reliably detect and plan for pedestrian actions around the roadway. This prevents pedestrians entering into the not-able-to-stop zone in front of vehicles—vehicle behavior would be to slow or stop yielding to the pedestrian before the zone is entered.
   k. Provide a standard for disabling pedestrian tracking device messaging when the pedestrian enters into a vehicle.

The Common Means for Testing that all AV Architecture Compliant Vehicles (Manual and Autonomous) are Rules Compliant:

5. Testing and behavior assurance
   a. Define a standard means for testing vehicle products to these standards to assure design reliability.
      i. Include design procedure guidelines
      ii. OEM testing guidelines
      iii. Certified National specific testing Lab(s)
      iv. Standards for safety non-volatile logging at a minimum including: recording of vehicle status, position, speed, direction data, manual driver automated driver controls state (for instance, steering, braking, speed control actions), basically the same parameters communication in V2V minimum message set.
   b. Maintain an open source National incident reporting system for accidents, causes, effects, mitigations—this includes all automated behaviors required to meet the National standard as it is initially defined and evolves through identification of accident causing faults and the mitigation behavior determined to resolve/remove these faults.
   c. Create a standard training course and certification for accident scene investigators—link back to the National incident reporting database so that accident incident study results are captured and analysis put into the common incident knowledge base.

V2V, V2I, and V2P Radio Messaging Design and Functions

A common communication standard for V2x, including V2V, V2I and V2P/P2V (vehicle to pedestrian and pedestrian to vehicle) must be implemented into a autonomous transportation system infrastructure designed to take the likelihood of accidents to near 0%. Most accidents in a human driven transportation system are due to human error or misjudgment. To get to near 0% it is necessary to take all the guess work out of the system, replacing it with accurate predictive information. At the core of this each active participant must communicate intentions into the future for a long enough period of time to support accommodation by other active participants, and/or detection of plan errors so the active participant can reliably re-plan for safe operations. The typical stopping distance of a passenger vehicle is estimated to be Speed+Speed/2=Number*3 and that is the braking distance. At 70 MPH, 70 MPH+35 MPH=105 ft*3=315 ft stopping distance. Travelling at 70 mph, 315 ft is equal to 315/102.7=3.1 seconds (approx).[13]

[13] A more complex estimate of braking distance is described in https://en.wikipedia.org/wiki/Braking_distance and many tables have been composed to provide estimates.

Given that traffic might be heading in two directions, a safe time might be double that or for 70 MPH 6 seconds. The same calculation at 30 MPH yields 135 ft but still 3.1 seconds. Thus, each vehicle in a traffic proximity (defined as the worst case stopping distance at vehicle to object closing speeds) needs to be aware of the future drive path of the other vehicles in the same proximity. This implies that V2V transmissions should include between approximately 6 seconds of future planned driving path (plan location, speed and steer angle) so all other vehicles in the same zone can avoid. Furthermore, travel velocity for a vehicle has to be reduced to stay within the zone where all other path knowledge is available and accurate.

Pedestrians move slowly (relative to vehicles) within the proximity zone, but are easily obscured by fixed and other moving objects (parked cars, shrubbery, etc.). Therefore they also must project their future intensions within the speed limit determined proximity distance. Therefore a pedestrian's future location based on projection of path, direction, and speed, should be projected about 6 seconds as well (along with an assumption by vehicles of a 6 second zone of random walk uncertainty because he/she could readily change directions of travel). This requires a V2P communication protocol to compute pedestrian travel location, rate, and direction into a projected path for consumption by vehicles in the same proximity. This may be accomplished with an active tagging system like that in the Apple iWatch (GPS & LTE data communications) or a comparable device or pendant.

The pedestrian tagging device must disable messaging when the pedestrian enters a vehicle so as not to interfere with V2V communications. This can be accomplished many ways including detecting in-vehicle emissions, for instance from automated ignition key fob; detecting vehicle position and pedestrian position information as being essentially the same (overlapping in position); detection of the vehicle's wireless phone connection network (typically Bluetooth), etc.

Since infrastructure does not move, it need not participate in transmissions that communicate positions or tracks. However, infrastructure at a minimum needs to communicate speed limits (min/max) or lane limitations (i.e. lane blockages or re-routings), and allowed travel through controlled intersections (stoplights). Static information like speeds and lane closures could be communication through the AV's static roadmap databased, and not through V2I messaging, however, V2I messaging provides a means for immediately updating data overriding static information in a down loaded map.

Decoding the infrastructure information through computer vision or other sensors of traffic flow through intersections is no completely reliable (a recent paper by Fairchild at al. cites a probability of correctness of 95%-99% which would translate into worst case 1 errors per 20 traffic controlled intersections—clearly not 100% assured safety).[14] In our approach, the traffic signals would transmit intersection status to all the vehicles entering into the intersection proximity. Each lane will be (a) blocked, or (b) free to allow vehicle movement. Lanes allowing movement into the intersection will offer list of exit lanes allowed to the vehicle entering the intersection from the entry. This, for instance, might offer the vehicle in the right hand lane the option to proceed straight through the intersection, or to take a right turn, but might not allow a left turn if this is prohibited. Such a syntax will all coding of all allowed traffic directors through wireless messages that presenting are present to human drivers as turn arrows, left/right turn prohibited signage, light colors (red-stop, yellow prepare to stop, and green proceed), etc.

[14] David I. Ferguson, Nathaniel Fairfield, Anthony Levandowski, U.S. Pat. No. 9,145,140 B2, Robust method for detecting traffic signals and their associated states, also described in Fairfield, Nathaniel, and Chris Urmson. "Traffic light mapping and detection." Robotics and Automation (ICRA), 2011 IEEE International Conference on. IEEE, 2011.

Vehicles themselves will accomplish some of the function of traffic control infrastructure at intersections where this infrastructure is not present (uncontrolled intersections). Most state driving regulations state that a vehicle on a higher priority route has precedence over vehicles turning from a lower priority route into the higher priority route. The issue is determination of route priority. This can be accomplished either through active infrastructure messages or through a priori knowledge derived from a digital map onboard each vehicle. At uncontrolled intersections of equal priority routes, most state's regulations specify that the first vehicle to the intersection has priority and all others are supposed to yield.

When two vehicles arrive or are at the intersection stopped at the same time, the one to the right has priority and the rest are supposed to yield. Once one vehicle goes through the intersections, the one to its left would go next in a round robin style. As anyone who drives knows, human drivers do not strictly adhere to these rules so to support an autonomous vehicle infrastructure the rules have to become embedded into to vehicle's automated controls and communicated as intentions to move to all the other vehicles in the intersection proximity—disallowing illegal driver prematurely ceasing priority out of turn. Otherwise polite automated vehicles will get stuck or will slow down traffic through the intersection due to aggressive manual drivers.

When entering into a yield intersection (like a roundabout where the entering vehicle yields to those in the circle, or onto a freeway where the entering vehicle yields to traffic already on the freeway), messages requesting entry into traffic from the yielding vehicle must be detected by traffic that has priority or the incoming vehicle may not ever be able to enter the priority traffic flow, thus completely blocking feed traffic flow. The traffic in the priority flow has to detect the request to enter message, slow sufficiently to make a "hole" in the traffic and the yielding vehicle has to speed up and enter that hole when it arrives. In all the autonomous systems presently under testing, this is accomplished through simply waiting for the hole which may never arrive. In a production autonomous transportation system that is designed to handle heavy traffic, the requesting of and creation of entry holes will have to be accomplish through an active request message and response behavior (and response message indication the availability of the created entry hole).

Messages to and from Navigation and Roadway Status Servers

In some map and navigation services, large maps are downloaded into a vehicle navigational system during service or when software updates might occur. However, modern systems employ periodic wide area network incremental updating, generally employing cellular wireless internet or a proximal WiFi digital network connect.[15] This technical approach allows for continuous update from the vehicle to the navigational server of items including new route requests, maximum, minimum, and average drive speeds being driven, debris on the road, adverse driving conditions reports, locations in need of roadway repair, road blockages, etc. It also supports downloading to the vehicle (the client) from the server data like new map segments for route planning, suggested routes if server performed route planning for the vehicle, changes in the roadway such as new roads, closed roads, construction work areas due to new construction or maintenance, support messages for differential GPS corrections, and/o dynamic traffic information like heavy traffic stoppage, changes in speed limits, intersection light or flow priority changes, etc. Because these messages are generated from any vehicle on the road and each vehicle must access a common set of road, speed limit, traffic, and blockage data to assure that they all behave according to a common set of rules over a common set of input navigation planning data, a minimum set of messages describing each item cited must be define with our system.

[15] Google Maps, https://en.wikipedia.org/wiki/Google_Maps, Oct. 10, 2018.

Presently for "optional" GPS navigation aids to human drivers, each vehicle can acquire such data to the extent that it is available from alternative vendors (or not at all for vehicles that are operated without the aid of GPS navigational aids). Moving over to a system evolving to fully autonomous behaviors, this utilization of different and not necessarily correlated data sources for plan will cause unsafe conditions (for instance, when one vehicle sees an upcoming work area and begins to take appropriate speed and evasive maneuvers, while another vehicle, not sharing this information, does not). While the concept presently implemented by client server systems like Google Maps does not have to change fundamentally, it does become necessary to define a open protocol that shared across the vehicle fleet and is accessible by municipalities and maintenance work crews so all vehicles share a common knowledge base describing the driving environment. Also it is worth noting that present fully autonomous vehicles employ maps with resolution down to the road lane, and approximately +/−2-10 cm (not larger than approximate a tire width). This resolution of map data, while able to be acquired and available in some roadway areas, exceeds the present resolution of data distributed by client-server systems presently deploy for driver directions quality GPS navigation systems (Google Maps, Mapquest, Tom-Tom, Waze app, etc.).

Describing Cooperative Driving Methods, and Behaviors

The majority of AV driving behavior is to safely keep to the planned driving path, within a given lane of traffic. However, more complex behavior becomes necessary to change lanes, merge unto highways, navigate through intersections, and make smaller navigational adjustments to avoid obstacles and sometimes other vehicles. With the V2V capabilities already described, most vehicles, pedestrians, and infrastructure imposed rules and conditions can be planned for with a proximal area around a vehicle in motion. Data derived from these messages is augmented by direct obstacle measurements from RADAR, LADAR and video captured and processed sensors. The basic process is that moment by moment, the vehicle creates a future planned path (over distances necessary to create the status messages previously described—typically 1-6 seconds worth), and then intersects that path with a known obstacle map locally centered over the vehicle out to ranges within that 6 second distance interval (at 70 MPH, approximately 600 feet).

If the planned path takes the vehicle inside the safe distance from an obstacle (at high speeds nominally 1-2 meters, at lower speeds perhaps as low as 12-15 cm), the path is modified to produce a larger safety distance. If the path deviation exceeds a preplanned maximum (so in an expressway lane which is approximately 12 feet (3.7 m), with a vehicle which is about 2 meters wide and lane centered, the allowed path deviation might be set to 3.7-2/2 meters or 1.65 meters), the vehicle must employ slowing or stopping (i.e. slowing to the estimated speed of the obstacle which is stopping for a fixed obstacle or speed pacing for a moving vehicle blocking the lane ahead).

Considering the roadway leading to an intersection as a zone where passing is disallowed, the no passing distance is at least the stopping distance at speed (which we previously estimated as 3 seconds of travel so at 30 MPH that is 135 feet, at 70 MPH, 315 feet).

To merge into a roadway with moving traffic, a hole sufficient for safe entry has to be made. This should be requested by the vehicle merging into traffic and acknowledged by cross traffic vehicles. Vehicles in cross traffic acknowledging the request should slow down to create a sufficiently sized hole. This behavior applies to lane changes, traffic circles, un-managed intersections where cross traffic has priority and does not have to stop, and for merging onto highways from entry ramps. Merging onto highways assumes that the entry vehicle is accelerating up to the traffic speed so spacing obeys highway spacing rules (one car length per 10 MPH between cars so the space needs to be that times 2). Entering into an unmanaged intersection with through cross traffic requires at least similar same spacing to allow for the time needed to accelerate from zero to the cross traffic speed.

In general, automated vehicles should avoid lane changing, but sometimes this is unavoidable due to an up-coming left turn, stalled vehicles in one lane, etc. Lane changing is s special case of crossing or entering cross traffic. The vehicle changing lanes should send a lane enter request to proximal vehicles. It should measure the traffic hole in the adjacent lane and inhibit lane change unless the hole is greater than or equal to one car length per 10 MPH*2 between leading and trailing cars. Lane changes should be inhibited into intersections for nominally one car length per 10 MPH from the intersection.

Managed or stoplight intersections can be built almost arbitrarily complex with right or left turn only lanes, pop-up messages like "No Turn on Red," and multiple RYG lights located at corners, over specific lanes, and orientated horizontally or vertically. The vast array of alternative in operation in North America call for active traffic control through managed intersections via V2I messaging as discussed earlier. Under this model, visual decoding of lights and traffic flow controls is replaced by V2I messages that direct traffic through the intersection according to the intersection-specific rules (which are marked on the roadway and presented to manual drivers through visual cues). We suggest that future manually driven vehicles are to be equipped with dash-mounted stop, go, warn, and turn director displays that present the digital traffic flow riles applicable to the specific vehicle/drive based on the same V2I messages which are sent to automated vehicles.

Unmanaged intersections, where one set of through traffic does not stop (has priority), is handled as indicated previously with low priority traffic stopping until the higher priority traffic either abates, or a where a traffic hole of sufficient length or time interval has been created as a consequence of V2V messaging from a low priority vehicle to proximal higher priority vehicles requesting creation of a hole in traffic flow sufficient for the lower priority vehicle to enter the higher priority traffic flow.

For n-way stop unmanaged intersections (which is what any unmarked intersection should be consider by default), each approaching vehicle stops. The vehicle which is measured to be the first to stop, gets the first right-of-way to proceed through the intersection. Then around the intersection counter clockwise, the next vehicle (to the right) goes next. If two vehicles arrive simultaneously, the one to the left yields to the one on the right. As sometimes happens due to timing, judgment, or system failure, if vehicle populate all entries into the intersection simultaneously, any one of them could go first (the rest yielding) to start alternation through the intersection. A simple method for determining which vehicle will go first is through employing vehicle embedded random number generators that translate into wait time before taking the initiative to go. When any of the vehicles goes first, the rest follow the yield right rule to resolve who goes next. If for some reason two vehicles go simultaneously, they should proceed through the intersection with full obstacle avoidance behavior enabled so any prospect of collision is mitigated.

Transition from all Manually Drive Vehicles to Mix Manual Automated Vehicle Traffic Regardless of how one implements autonomous driving it will be performed by algorithmic methods that model vehicle physics—acceleration/deceleration rates acceptable to passengers, maximum stopping for avoiding dangerous potential collisions, vehicle power and mass functions projected forward to avoid collisions, etc. It will not involve modeling of detailed assessment of surrounding driver psychological behavior to the degree that a human driver might assess. For that reason, AVs are likely to require more rigorous enforcement of vehicle spacing, speed limit obedience to the letter, and a propensity to stop when obstacle are presented suddenly. Thus, in some ways, the AV autonomous driver will more like an inexperienced student driver than a more mature driver. We mark student drivers with a warning sign. We mark work vehicles like forklifts or earth movers that might present a danger with audible tones and flashing lights. We mark extra wide loads with signs and lights. Similarly we will require rules that standardize markings to show when an AV is driving in autonomous mode. Similarly the ADS should employ all manual signaling means (brake lights, turn signals, back-up lights, headlights, etc.) in the same way as would a human driver.

As disclosed earlier, an AV integrates the ADS and manual driving environment, manages intersections and active traffic controls, and communicates with vehicles through V2I messaging. Both manually driven and ADS driven vehicles should provide a display that indicates go, stop, and warn stop light status, and means to indicate lane turn instructions, individualized to each vehicle entering the intersection by lane. Similarly, speed limit messages should be detected and displayed on the user interface (as well as enforced by vehicle speed controls), eliminating the possibility of exceeding speed limits. Because the vehicle will know its speed and speed limit at all times, it should enforce, even on manual drivers, safe stopping room to the vehicle ahead (1 car length per 10 MPH of travel speed).

In dense urban areas, depending on sensing and measuring the distance to a pedestrian and avoiding such obstacles may not be adequate. Both the manual vehicle and the ADS require a means to detect and localize pedestrians in the same way as they will be able to detect and localize other vehicles. A pedestrian worn device like an Apple iWatch includes a GPS locator and the means for entering into the local cellular phone radio network (which is or potentially is part of the V2V communication mesh). This such a device allows on-coming vehicles to localize pedestrians even if they are obscured by infrastructure, parked cars, or other obstructions—eliminating surprises to an ADS or manual driver that occur when the pedestrian "pops" out from behind something.

Because any anticipated AV autonomous driver system cannot be anticipated to be perfect (i.e. to have knowledge of how to control the vehicle under all possible roadway, weather, and driving situations), a manual driver will require an industry wide standard approach to reacquiring control. Cruise controls employ either manually turning off cruise or tapping the brake to stow down the vehicle. These methods would be comparably applicable to taking a vehicle from automated mode to manual mode. However, manual re-acquisition of steering will be necessary as well so to implement these methods, we would add detection of re-acquisition of steering through wheel grasping and effecting manual steering contrary to any automated steering torques (i.e. the wheel tracks an external application of steering force over any internally generated force from an autonomous steering control system).

While in autonomous mode, or under the control of an ADS, the ADS display to the manual driver must include that the ADS is functioning properly, the status of ADS engagement (ADS is on or off), that the ADS currently "unavailable" for use (may be due to sensors malfunction, autonomous controls malfunction, weather or road conditions outside of nominal, a roadway or map segment which precludes or prohibits ADS operation, etc.), and the means requesting control transition from the ADS to the human driver or operator (standard means for signaling the driver to take control from the ADS—flashing visual indicator, vibrating seat, vibrating steering wheel, verbal commands, etc.). If the driver does not attend to this request for control transition within a predetermined time (1 to 2 seconds), the ADS must provide a behavior that effectively safes the vehicle—typically this would be slowing and stopping, and where the road provides a shoulder, steering over on to it.

Testing and Dissemination of Policies, Procedures, and Algorithms

Like the Internet of information we now take for granted, a network of automated vehicles will require a base layer of behaviors that are correctly implemented, tested and common throughout the roadway infrastructure and vehicle fleet. This is analogous to the IP protocols that are commonly used at the base implementation of the Internet. Like with IP, which is controlled and informed through an open process where developers refer and add to the RFCs (Requests for Comment),[16] thereby keeping all IP related and protocol implementations common and compatible, a similar process will be required for maintaining an integrated autonomous vehicle infrastructure system. As indicated earlier, a common evolving set of design guidelines will be defined either by a private standard group like SAE or by the Government (a consortium of States and/or the Department of Transportation). Furthermore, key common message formats for V2V/V2I/V2P messaging, common behaviors (at intersections, when changing lanes, when maintaining lane position, when merging, etc.), common error mitigations (emergency stops, or shoulder entry maneuvers, means for notifying drivers to take control, means of mitigation when drivers fail to take control after notification, etc.), common driver vehicle driving and status interfaces, and common means for indicating to other vehicles and drivers the operating mode of the vehicles in autonomous mode must be shared across the entire industry so that commonality of the system can be achieved and maintained. Additionally, as issues, errors, and problems are identified (which we anticipate would be a continuous and long-term process), a means for mandatory reporting and publishing of problem mitigations should be established and operated as part of the system certification process.

[16] RFC: Request For Comment—maintained for the Internet by Internet Engineering Task Force, https://www.rfc-editor.org/retrieve/

The architecture as disclosed provides a means for implementing mixed AV and manual driving zones within which accident rate can be brought down to nearly zero. We would suggest any lesser goal for autonomous driving technology over public roads is negligent.[17]

[17] Chao, Elain L., Sec. Dept. of Trans., "Automated Driving Systems 2.0: A Vision For Safety", https://www.nhtsa.gov/sites/nhtsa.dot.gov/files/documents/13069a-ads2.0_090617_v9a_tag.pdf

The invention claimed is:

1. A transportation system for managing vehicular behavior, comprising:
 multiple autonomous vehicles (AVs) and manual vehicles (MVs) interoperating in a common driving environment defined by a shared set of driving rules, each AV including:
 (a) a drive train including a source of motive power coupled to wheels, a steering system, and controls for acceleration and braking;
 (b) a first set of sensors operative to provide self-location of the AV;
 (c) a second set of sensors operative to monitor an environment surrounding the AV;
 (d) a wireless communications interface;
 (e) a memory storing road maps including information regarding infrastructure locations, roadways and intersections, and route plans including paths from starting points to destinations;
 (f) an electronic controller in communication with (a), (b), (c), (d) and (e), and wherein the electronic controller is operative to start, stop, steer, and control the speed of the AV to execute the route plans;
 each MV including:
 (g) a drive train including a source of motive power coupled to wheels, a steering system, and controls for acceleration and braking;
 (h) a wireless communications interface;
 (i) a memory storing road maps including information regarding the location of infrastructure, roadways and intersections;
 (j) an electronic controller in communication with (g), (h) and (i), and wherein the electronic controller is operative to start, stop, steer, and control the speed of the MV in accordance with operator commands;
 one or more infrastructure devices, each infrastructure device including a wireless communications interface;
 wherein both the AVs and MVs receive messages from each other and from the infrastructure devices enabling the AVs and MVs to determine the status of traffic conditions and infrastructure in their vicinity;
 wherein the AVs and MVs both store the shared set of driving rules; and
 wherein the both the AVs and MVs execute the shared set of driving rules in accordance with the sensor inputs received and the messages exchanged to determine how to operate in the common driving environment.

2. The transportation system of claim 1, wherein the first set of sensors operative to provide self-location of the AV includes one or more of the following:
 GPS,
 3D point cloud measurements and matching;
 inertial measurements, and
 wheel or speed measurement.

3. The transportation system of claim 1, wherein the second set of sensors operative to monitor an environment surrounding the AV include one or more of the following:
 LADAR
 LIDAR,
 RADAR, and
 optical, ranging or stereo computer vision.

4. The transportation system of claim 1, including an AV with an electronic controller operative to perform object recognition or image learning in conjunction with a sensor input.

5. The transportation system of claim 1, wherein the route plans executed by the AV include a planner operative to generate paths from a starting point to one or more destinations or intermediary points.

6. The transportation system of claim 1, wherein the route plans executed by the AV include generating vehicle controls based on information associated with paths that dictate vehicle behavior in proximity to locations along the paths.

7. The transportation system of claim 1, wherein the information includes stop signs, speed limits, lane change prohibitions, or specific tasks executed by AV payloads along the paths.

8. The transportation system of claim 1, wherein the road maps stored by the AVs and MVs include terrain information.

9. The transportation system of claim 1, wherein, in accordance with the rules, the AVs have the ability to deviate from a planned path due to avoid obstacles or road conditions.

10. The transportation system of claim 1, wherein, in accordance with the rules, the AVs have the ability to perform enhanced braking and acceleration functions to avoid obstacles and collisions.

11. The transportation system of claim 1, further including active localization and messaging tagging units carried or worn by pedestrians to inform AVs or MVs as to the position or movement of the pedestrians.

12. The transportation system of claim 1, further including active localization and messaging tagging units supported on roadway or vehicle protected objects to inform AVs or MVs as to the position of the objects.

13. The transportation system of claim 1, further including AVs that identify, pick up and place packages, pallets, containers or other payloads.

14. The transportation system of claim 1, further including AVs with electronic controllers that are programmed to automatically perform one or more of the following functions:
- parking,
- trailer coupling and detachment,
- refueling, and
- vehicle washing or maintenance.

15. The transportation system of claim 1, including one or more infrastructure devices with sensors operative to detect vehicles entering or within an intersection and communicate this information to other vehicles entering or within the intersection.

16. The transportation system of claim 1, including one or more infrastructure devices operative to control intersection lights sequencing or directional light functions to improve traffic flow or avoid collisions.

* * * * *